US009652668B2

(12) United States Patent
Holz et al.

(10) Patent No.: US 9,652,668 B2
(45) Date of Patent: May 16, 2017

(54) ENHANCED CONTRAST FOR OBJECT DETECTION AND CHARACTERIZATION BY OPTICAL IMAGING BASED ON DIFFERENCES BETWEEN IMAGES

(71) Applicant: Leap Motion, Inc., San Francisco, CA (US)

(72) Inventors: David S. Holz, San Francisco, CA (US); Hua Yang, Millbrae, CA (US)

(73) Assignee: Leap Motion, Inc., San Francisco, CA (US)

( * ) Notice: Subject to any disclaimer, the term of this patent is extended or adjusted under 35 U.S.C. 154(b) by 0 days.

(21) Appl. No.: 15/349,864

(22) Filed: Nov. 11, 2016

(65) Prior Publication Data

US 2017/0061205 A1    Mar. 2, 2017

Related U.S. Application Data

(63) Continuation of application No. 14/959,891, filed on Dec. 4, 2015, which is a continuation of application (Continued)

(51) Int. Cl.
*G06T 17/00*    (2006.01)
*G06K 9/00*    (2006.01)
(Continued)

(52) U.S. Cl.
CPC ......... *G06K 9/00375* (2013.01); *G06F 3/017* (2013.01); *G06K 9/00201* (2013.01);
(Continued)

(58) Field of Classification Search
CPC ............. G06K 9/3233; G06K 9/00201; G06K 9/00375
See application file for complete search history.

(56) References Cited

U.S. PATENT DOCUMENTS 2,665,041 A    1/1954 Maffucci
4,175,862 A    11/1979 DiMatteo et al.
(Continued)

FOREIGN PATENT DOCUMENTS

CN    1984236 A    6/2007
CN    201332447 Y    10/2009
(Continued)

OTHER PUBLICATIONS

Dombeck, D., et al., "Optical Recording of Action Potentials with Second-Harmonic Generation Microscopy," The Journal of Neuroscience, Jan. 28, 2004, vol. 24(4): pp. 999-1003.
(Continued)

*Primary Examiner* — Vu Le
*Assistant Examiner* — Mia M Thomas
(74) *Attorney, Agent, or Firm* — Haynes Beffel & Wolfeld LLP; Ernest J. Beffel, Jr.

(57) ABSTRACT

Enhanced contrast between an object of interest and background surfaces visible in an image is provided using controlled lighting directed at the object. Exploiting the falloff of light intensity with distance, a light source (or multiple light sources), such as an infrared light source, can be positioned near one or more cameras to shine light onto the object while the camera(s) capture images. The captured images can be analyzed to distinguish object pixels from background pixels.

19 Claims, 8 Drawing Sheets

Related U.S. Application Data

No. 14/106,148, filed on Dec. 13, 2013, which is a continuation of application No. 13/742,845, filed on Jan. 16, 2013, now Pat. No. 8,693,731, which is a continuation-in-part of application No. 13/724,357, filed on Dec. 21, 2012, now Pat. No. 9,070,019, and a continuation-in-part of application No. 13/414,485, filed on Mar. 7, 2012, said application No. 13/724,357 is a continuation-in-part of application No. 13/414,485, filed on Mar. 7, 2012.

(60) Provisional application No. 61/587,554, filed on Jan. 17, 2012, provisional application No. 61/724,091, filed on Nov. 8, 2012, provisional application No. 61/724,068, filed on Nov. 8, 2012, provisional application No. 61/587,554, filed on Jan. 17, 2012, provisional application No. 61/724,091, filed on Nov. 8, 2012.

(51) Int. Cl.
   *G06K 9/32*      (2006.01)
   *G06T 7/00*      (2017.01)
   *G06K 9/20*      (2006.01)
   *G06K 9/62*      (2006.01)
   *G06F 3/01*      (2006.01)
   *G06T 7/20*      (2017.01)

(52) U.S. Cl.
   CPC ......... *G06K 9/2027* (2013.01); *G06K 9/3233* (2013.01); *G06K 9/6202* (2013.01); *G06T 7/004* (2013.01); *G06T 7/0081* (2013.01); *G06T 7/2006* (2013.01); *G06T 2207/10016* (2013.01); *G06T 2207/20144* (2013.01)

(56) References Cited

U.S. PATENT DOCUMENTS

| | | |
|---|---|---|
| 4,879,659 A | 11/1989 | Bowlin et al. |
| 5,134,661 A | 7/1992 | Reinsch |
| 5,282,067 A | 1/1994 | Liu |
| 5,434,617 A | 7/1995 | Bianchi |
| 5,454,043 A | 9/1995 | Freeman |
| 5,574,511 A | 11/1996 | Yang et al. |
| 5,581,276 A | 12/1996 | Cipolla et al. |
| 5,594,469 A | 1/1997 | Freeman et al. |
| 5,691,737 A | 11/1997 | Ito et al. |
| 5,742,263 A | 4/1998 | Wang et al. |
| 5,900,863 A | 5/1999 | Numazaki |
| 5,940,538 A | 8/1999 | Spiegel et al. |
| 6,002,808 A | 12/1999 | Freeman |
| 6,031,161 A | 2/2000 | Baltenberger |
| 6,031,661 A | 2/2000 | Tanaami |
| 6,072,494 A | 6/2000 | Nguyen |
| 6,075,895 A | 6/2000 | Qiao et al. |
| 6,147,678 A | 11/2000 | Kumar et al. |
| 6,154,558 A | 11/2000 | Hsieh |
| 6,181,343 B1 | 1/2001 | Lyons |
| 6,184,326 B1 | 2/2001 | Razavi et al. |
| 6,184,926 B1 | 2/2001 | Khosravi et al. |
| 6,195,104 B1 | 2/2001 | Lyons |
| 6,204,852 B1 | 3/2001 | Kumar et al. |
| 6,252,598 B1 | 6/2001 | Segen |
| 6,263,091 B1 | 7/2001 | Jain et al. |
| 6,346,933 B1 | 2/2002 | Lin |
| 6,417,970 B1 | 7/2002 | Travers et al. |
| 6,492,986 B1 | 12/2002 | Metaxas et al. |
| 6,493,041 B1 | 12/2002 | Hanko et al. |
| 6,498,628 B2 | 12/2002 | Iwamura |
| 6,578,203 B1 | 6/2003 | Anderson, Jr. et al. |
| 6,603,867 B1 | 8/2003 | Sugino et al. |
| 6,661,918 B1 | 12/2003 | Gordon et al. |
| 6,674,877 B1 | 1/2004 | Jojic et al. |
| 6,702,494 B2 | 3/2004 | Dumler et al. |
| 6,734,911 B1 | 5/2004 | Lyons |
| 6,738,424 B1 | 5/2004 | Allmen et al. |
| 6,798,628 B1 | 9/2004 | Macbeth |
| 6,804,654 B2 | 10/2004 | Kobylevsky et al. |
| 6,804,656 B1 | 10/2004 | Rosenfeld et al. |
| 6,814,656 B2 | 11/2004 | Rodriguez |
| 6,819,796 B2 | 11/2004 | Hong et al. |
| 6,919,880 B2 | 7/2005 | Morrison et al. |
| 6,950,534 B2 | 9/2005 | Cohen et al. |
| 6,993,157 B1 | 1/2006 | Oue et al. |
| 7,152,024 B2 | 12/2006 | Marschner et al. |
| 7,213,707 B2 | 5/2007 | Hubbs et al. |
| 7,215,828 B2 | 5/2007 | Luo |
| 7,244,233 B2 | 7/2007 | Krantz et al. |
| 7,257,237 B1* | 8/2007 | Luck ............... A61B 5/1113 382/103 |
| 7,259,873 B2 | 8/2007 | Sikora et al. |
| 7,308,112 B2 | 12/2007 | Fujimura et al. |
| 7,340,077 B2 | 3/2008 | Gokturk et al. |
| 7,483,049 B2 | 1/2009 | Aman et al. |
| 7,519,223 B2 | 4/2009 | Dehlin et al. |
| 7,532,206 B2 | 5/2009 | Morrison et al. |
| 7,536,032 B2 | 5/2009 | Bell |
| 7,542,586 B2 | 6/2009 | Johnson |
| 7,598,942 B2 | 10/2009 | Underkoffler et al. |
| 7,606,417 B2 | 10/2009 | Steinberg et al. |
| 7,646,372 B2 | 1/2010 | Marks et al. |
| 7,656,372 B2 | 2/2010 | Sato et al. |
| 7,665,041 B2 | 2/2010 | Wilson et al. |
| 7,692,625 B2 | 4/2010 | Morrison et al. |
| 7,831,932 B2 | 11/2010 | Josephsoon et al. |
| 7,840,031 B2 | 11/2010 | Albertson et al. |
| 7,861,188 B2 | 12/2010 | Josephsoon et al. |
| 7,940,885 B2 | 5/2011 | Stanton et al. |
| 7,948,493 B2 | 5/2011 | Klefenz et al. |
| 7,961,174 B1 | 6/2011 | Markovic et al. |
| 7,961,934 B2 | 6/2011 | Thrun et al. |
| 7,971,156 B2 | 6/2011 | Albertson et al. |
| 7,980,885 B2 | 7/2011 | Gattwinkel et al. |
| 8,023,698 B2 | 9/2011 | Niwa et al. |
| 8,045,825 B2 | 10/2011 | Shimoyama et al. |
| 8,064,704 B2 | 11/2011 | Kim et al. |
| 8,085,339 B2 | 12/2011 | Marks |
| 8,086,971 B2 | 12/2011 | Radivojevic et al. |
| 8,111,239 B2 | 2/2012 | Pryor et al. |
| 8,112,719 B2 | 2/2012 | Hsu et al. |
| 8,144,233 B2 | 3/2012 | Fukuyama |
| 8,185,176 B2 | 5/2012 | Mangat et al. |
| 8,213,707 B2 | 7/2012 | Li et al. |
| 8,218,858 B2 | 7/2012 | Gu |
| 8,229,134 B2 | 7/2012 | Duraiswami et al. |
| 8,244,233 B2 | 8/2012 | Chang et al. |
| 8,249,345 B2 | 8/2012 | Wu et al. |
| 8,270,669 B2 | 9/2012 | Aichi et al. |
| 8,289,162 B2 | 10/2012 | Mooring et al. |
| 8,290,208 B2 | 10/2012 | Kurtz et al. |
| 8,304,727 B2 | 11/2012 | Lee et al. |
| 8,319,832 B2 | 11/2012 | Nagata et al. |
| 8,325,993 B2* | 12/2012 | Dinerstein ......... G06K 9/00033 382/115 |
| 8,363,010 B2 | 1/2013 | Nagata |
| 8,395,600 B2 | 3/2013 | Kawashima et al. |
| 8,514,221 B2 | 8/2013 | King et al. |
| 8,553,037 B2 | 10/2013 | Smith et al. |
| 8,582,809 B2 | 11/2013 | Halimeh et al. |
| 8,593,417 B2 | 11/2013 | Kawashima et al. |
| 8,631,355 B2 | 1/2014 | Murillo et al. |
| 8,638,989 B2 | 1/2014 | Holz |
| 8,659,594 B2 | 2/2014 | Kim et al. |
| 8,659,658 B2 | 2/2014 | Vassigh et al. |
| 8,693,731 B2 | 4/2014 | Holz et al. |
| 8,724,906 B2* | 5/2014 | Shotton ............ G06T 7/0046 382/209 |
| 8,738,523 B1 | 5/2014 | Sanchez et al. |
| 8,744,122 B2 | 6/2014 | Salgian et al. |
| 8,817,087 B2 | 8/2014 | Weng et al. |
| 8,842,084 B2 | 9/2014 | Andersson et al. |
| 8,843,857 B2 | 9/2014 | Berkes et al. |

(56) References Cited

U.S. PATENT DOCUMENTS

| | | | |
|---|---|---|---|
| 8,872,914 B2 | 10/2014 | Gobush | |
| 8,878,749 B1 | 11/2014 | Wu et al. | |
| 8,879,835 B2* | 11/2014 | Krishnaswamy | G06K 9/00 382/162 |
| 8,891,868 B1 | 11/2014 | Ivanchenko | |
| 8,907,982 B2 | 12/2014 | Zontrop et al. | |
| 8,929,609 B2 | 1/2015 | Padovani et al. | |
| 8,930,852 B2 | 1/2015 | Chen et al. | |
| 8,942,881 B2 | 1/2015 | Hobbs et al. | |
| 8,954,340 B2 | 2/2015 | Sanchez et al. | |
| 8,957,857 B2 | 2/2015 | Lee et al. | |
| 9,014,414 B2 | 4/2015 | Katano et al. | |
| 9,056,396 B1 | 6/2015 | Linnell | |
| 9,063,574 B1* | 6/2015 | Ivanchenko | G06F 3/017 |
| 9,070,019 B2 | 6/2015 | Holz | |
| 9,122,354 B2 | 9/2015 | Sharma | |
| 9,123,176 B2* | 9/2015 | Lu | G06T 13/80 |
| 9,124,778 B1 | 9/2015 | Crabtree | |
| 9,285,893 B2* | 3/2016 | Holz | G06K 9/00375 |
| 9,330,313 B2* | 5/2016 | Jung | G06K 9/00671 |
| 9,436,288 B2* | 9/2016 | Holz | B65D 75/5877 |
| 9,436,998 B2* | 9/2016 | Holz | G06K 9/3233 |
| 9,495,613 B2* | 11/2016 | Holz | H04N 5/232 |
| 9,501,152 B2* | 11/2016 | Bedikian | G06F 3/011 |
| 2001/0044858 A1 | 11/2001 | Rekimoto | |
| 2002/0008211 A1 | 1/2002 | Kask | |
| 2002/0080094 A1 | 6/2002 | Biocca | |
| 2002/0105484 A1 | 8/2002 | Navab et al. | |
| 2003/0053658 A1 | 3/2003 | Pavlidis | |
| 2003/0053659 A1 | 3/2003 | Pavlidis et al. | |
| 2003/0123703 A1 | 7/2003 | Pavlidis et al. | |
| 2003/0152289 A1 | 8/2003 | Luo | |
| 2003/0202697 A1 | 10/2003 | Simard et al. | |
| 2004/0103111 A1 | 5/2004 | Miller et al. | |
| 2004/0125228 A1 | 7/2004 | Dougherty | |
| 2004/0125984 A1 | 7/2004 | Ito et al. | |
| 2004/0145809 A1 | 7/2004 | Brenner | |
| 2004/0155877 A1 | 8/2004 | Hong et al. | |
| 2004/0212725 A1 | 10/2004 | Raskar | |
| 2005/0007673 A1 | 1/2005 | Chaoulov et al. | |
| 2005/0068518 A1 | 3/2005 | Baney et al. | |
| 2005/0094019 A1 | 5/2005 | Grosvenor et al. | |
| 2005/0131607 A1 | 6/2005 | Breed | |
| 2005/0156888 A1 | 7/2005 | Xie et al. | |
| 2005/0168578 A1 | 8/2005 | Gobush | |
| 2005/0236558 A1 | 10/2005 | Nabeshima et al. | |
| 2006/0017807 A1 | 1/2006 | Lee et al. | |
| 2006/0029296 A1 | 2/2006 | King et al. | |
| 2006/0034545 A1 | 2/2006 | Mattes et al. | |
| 2006/0050979 A1 | 3/2006 | Kawahara | |
| 2006/0072105 A1 | 4/2006 | Wagner | |
| 2006/0098899 A1 | 5/2006 | King et al. | |
| 2006/0204040 A1 | 9/2006 | Freeman et al. | |
| 2006/0210112 A1 | 9/2006 | Cohen et al. | |
| 2006/0290950 A1 | 12/2006 | Platt et al. | |
| 2007/0042346 A1 | 2/2007 | Weller | |
| 2007/0086621 A1 | 4/2007 | Aggarwal et al. | |
| 2007/0130547 A1 | 6/2007 | Boillot | |
| 2007/0206719 A1 | 9/2007 | Suryanarayanan et al. | |
| 2007/0230929 A1 | 10/2007 | Niwa et al. | |
| 2007/0238956 A1 | 10/2007 | Haras et al. | |
| 2008/0013826 A1 | 1/2008 | Hillis et al. | |
| 2008/0019576 A1 | 1/2008 | Senftner et al. | |
| 2008/0030429 A1 | 2/2008 | Hailpern et al. | |
| 2008/0031492 A1 | 2/2008 | Lanz | |
| 2008/0056752 A1 | 3/2008 | Denton et al. | |
| 2008/0064954 A1 | 3/2008 | Adams et al. | |
| 2008/0106637 A1 | 5/2008 | Nakao et al. | |
| 2008/0106746 A1 | 5/2008 | Shpunt et al. | |
| 2008/0110994 A1 | 5/2008 | Knowles et al. | |
| 2008/0118091 A1 | 5/2008 | Serfaty et al. | |
| 2008/0126937 A1 | 5/2008 | Pachet | |
| 2008/0187175 A1 | 8/2008 | Kim et al. | |
| 2008/0244468 A1 | 10/2008 | Nishihara et al. | |
| 2008/0246759 A1 | 10/2008 | Summers | |
| 2008/0273764 A1 | 11/2008 | Scholl | |
| 2008/0278589 A1 | 11/2008 | Thorn | |
| 2008/0304740 A1 | 12/2008 | Sun et al. | |
| 2008/0319356 A1 | 12/2008 | Cain et al. | |
| 2009/0002489 A1 | 1/2009 | Yang et al. | |
| 2009/0093307 A1 | 4/2009 | Miyaki | |
| 2009/0102840 A1 | 4/2009 | Li | |
| 2009/0103780 A1 | 4/2009 | Nishihara et al. | |
| 2009/0116742 A1 | 5/2009 | Nishihara | |
| 2009/0122146 A1 | 5/2009 | Zalewski et al. | |
| 2009/0153655 A1 | 6/2009 | Ike et al. | |
| 2009/0203993 A1 | 8/2009 | Mangat et al. | |
| 2009/0203994 A1 | 8/2009 | Mangat et al. | |
| 2009/0217211 A1 | 8/2009 | Hildreth et al. | |
| 2009/0257623 A1 | 10/2009 | Tang et al. | |
| 2009/0274339 A9 | 11/2009 | Cohen et al. | |
| 2009/0309710 A1 | 12/2009 | Kakinami | |
| 2010/0013832 A1 | 1/2010 | Xiao et al. | |
| 2010/0020078 A1 | 1/2010 | Shpunt | |
| 2010/0023015 A1 | 1/2010 | Park | |
| 2010/0026963 A1 | 2/2010 | Faulstich | |
| 2010/0027845 A1 | 2/2010 | Kim et al. | |
| 2010/0046842 A1 | 2/2010 | Conwell | |
| 2010/0053164 A1 | 3/2010 | Imai et al. | |
| 2010/0053209 A1 | 3/2010 | Rauch et al. | |
| 2010/0058252 A1 | 3/2010 | Ko | |
| 2010/0066737 A1 | 3/2010 | Liu | |
| 2010/0066975 A1 | 3/2010 | Rehnstrom | |
| 2010/0091110 A1 | 4/2010 | Hildreth | |
| 2010/0118123 A1 | 5/2010 | Freedman et al. | |
| 2010/0121189 A1 | 5/2010 | Ma et al. | |
| 2010/0125815 A1 | 5/2010 | Wang et al. | |
| 2010/0141762 A1 | 6/2010 | Siann et al. | |
| 2010/0158372 A1 | 6/2010 | Kim et al. | |
| 2010/0177929 A1 | 7/2010 | Kurtz et al. | |
| 2010/0194863 A1 | 8/2010 | Lopes et al. | |
| 2010/0199230 A1 | 8/2010 | Latta et al. | |
| 2010/0201880 A1 | 8/2010 | Iwamura | |
| 2010/0208942 A1 | 8/2010 | Porter et al. | |
| 2010/0219934 A1 | 9/2010 | Matsumoto | |
| 2010/0222102 A1 | 9/2010 | Rodriguez | |
| 2010/0264833 A1 | 10/2010 | Van Endert et al. | |
| 2010/0277411 A1 | 11/2010 | Yee et al. | |
| 2010/0296698 A1 | 11/2010 | Lien et al. | |
| 2010/0302357 A1 | 12/2010 | Hsu et al. | |
| 2010/0303298 A1 | 12/2010 | Marks et al. | |
| 2010/0306712 A1 | 12/2010 | Snook et al. | |
| 2010/0309097 A1 | 12/2010 | Raviv et al. | |
| 2011/0007072 A1 | 1/2011 | Khan et al. | |
| 2011/0025818 A1 | 2/2011 | Gallmeier et al. | |
| 2011/0026765 A1 | 2/2011 | Ivanich et al. | |
| 2011/0043806 A1 | 2/2011 | Guetta et al. | |
| 2011/0057875 A1 | 3/2011 | Shigeta et al. | |
| 2011/0080470 A1 | 4/2011 | Kuno et al. | |
| 2011/0080490 A1 | 4/2011 | Clarkson et al. | |
| 2011/0093820 A1 | 4/2011 | Zhang et al. | |
| 2011/0107216 A1 | 5/2011 | Bi | |
| 2011/0115486 A1 | 5/2011 | Frohlich et al. | |
| 2011/0116684 A1 | 5/2011 | Coffman et al. | |
| 2011/0119640 A1 | 5/2011 | Berkes et al. | |
| 2011/0134112 A1 | 6/2011 | Koh et al. | |
| 2011/0148875 A1 | 6/2011 | Kim et al. | |
| 2011/0169726 A1 | 7/2011 | Holmdahl et al. | |
| 2011/0173574 A1 | 7/2011 | Clavin et al. | |
| 2011/0181509 A1 | 7/2011 | Rautiainen et al. | |
| 2011/0193778 A1 | 8/2011 | Lee et al. | |
| 2011/0205151 A1 | 8/2011 | Newton et al. | |
| 2011/0213664 A1 | 9/2011 | Osterhout et al. | |
| 2011/0228978 A1 | 9/2011 | Chen et al. | |
| 2011/0234840 A1 | 9/2011 | Klefenz et al. | |
| 2011/0243451 A1 | 10/2011 | Oyaizu | |
| 2011/0261178 A1 | 10/2011 | Lo et al. | |
| 2011/0267259 A1 | 11/2011 | Tidemand et al. | |
| 2011/0267344 A1* | 11/2011 | Germann | G06K 9/00201 345/420 |
| 2011/0279397 A1 | 11/2011 | Rimon et al. | |
| 2011/0286676 A1 | 11/2011 | El Dokor | |
| 2011/0289455 A1 | 11/2011 | Reville et al. | |
| 2011/0289456 A1 | 11/2011 | Reville et al. | |

(56) References Cited

U.S. PATENT DOCUMENTS

| | | |
|---|---|---|
| 2011/0291925 A1 | 12/2011 | Israel et al. |
| 2011/0291988 A1 | 12/2011 | Bamji et al. |
| 2011/0296353 A1 | 12/2011 | Ahmed et al. |
| 2011/0299737 A1 | 12/2011 | Wang et al. |
| 2011/0304650 A1 | 12/2011 | Campillo et al. |
| 2011/0310007 A1 | 12/2011 | Margolis et al. |
| 2011/0310220 A1 | 12/2011 | McEldowney |
| 2011/0314427 A1 | 12/2011 | Sundararajan |
| 2012/0038637 A1 | 2/2012 | Marks |
| 2012/0050157 A1 | 3/2012 | Latta et al. |
| 2012/0065499 A1 | 3/2012 | Chono |
| 2012/0068914 A1 | 3/2012 | Jacobsen et al. |
| 2012/0159380 A1 | 6/2012 | Kocienda et al. |
| 2012/0163675 A1 | 6/2012 | Joo et al. |
| 2012/0194517 A1 | 8/2012 | Izadi et al. |
| 2012/0204133 A1 | 8/2012 | Guendelman et al. |
| 2012/0223959 A1 | 9/2012 | Lengeling |
| 2012/0236288 A1 | 9/2012 | Stanley |
| 2012/0250936 A1 | 10/2012 | Holmgren |
| 2012/0270654 A1 | 10/2012 | Padovani et al. |
| 2012/0274781 A1 | 11/2012 | Shet et al. |
| 2012/0281873 A1 | 11/2012 | Brown et al. |
| 2012/0293667 A1 | 11/2012 | Baba et al. |
| 2012/0314030 A1 | 12/2012 | Datta et al. |
| 2013/0019204 A1 | 1/2013 | Kotler et al. |
| 2013/0038694 A1 | 2/2013 | Nichani et al. |
| 2013/0044951 A1 | 2/2013 | Cherng et al. |
| 2013/0097566 A1 | 4/2013 | Berglund |
| 2013/0148852 A1 | 6/2013 | Partis et al. |
| 2013/0187952 A1 | 7/2013 | Berkovich et al. |
| 2013/0208948 A1 | 8/2013 | Berkovich et al. |
| 2013/0229508 A1* | 9/2013 | Li .................... G06F 1/3287 348/77 |
| 2013/0239059 A1 | 9/2013 | Chen et al. |
| 2013/0241832 A1 | 9/2013 | Rimon et al. |
| 2013/0252691 A1 | 9/2013 | Alexopoulos |
| 2013/0257736 A1 | 10/2013 | Hou et al. |
| 2014/0010441 A1 | 1/2014 | Shamaie |
| 2014/0028861 A1* | 1/2014 | Holz .................. H04N 5/23277 348/208.4 |
| 2014/0064566 A1 | 3/2014 | Shreve et al. |
| 2014/0081521 A1 | 3/2014 | Frojdh et al. |
| 2014/0085203 A1 | 3/2014 | Kobayashi |
| 2014/0125775 A1 | 5/2014 | Holz |
| 2014/0125813 A1* | 5/2014 | Holz .................. G06K 9/00375 348/169 |
| 2014/0139425 A1 | 5/2014 | Sakai |
| 2014/0139641 A1 | 5/2014 | Holz |
| 2014/0161311 A1 | 6/2014 | Kim |
| 2014/0168062 A1 | 6/2014 | Katz et al. |
| 2014/0176420 A1 | 6/2014 | Zhou et al. |
| 2014/0177913 A1 | 6/2014 | Holz |
| 2014/0189579 A1 | 7/2014 | Rimon et al. |
| 2014/0192024 A1 | 7/2014 | Holz |
| 2014/0222385 A1* | 8/2014 | Muenster ............ G01N 23/046 703/1 |
| 2014/0225826 A1 | 8/2014 | Juni |
| 2014/0253512 A1 | 9/2014 | Narikawa et al. |
| 2014/0253785 A1 | 9/2014 | Chan et al. |
| 2014/0258886 A1* | 9/2014 | Strong .............. H04M 1/72522 715/753 |
| 2014/0267098 A1 | 9/2014 | Na et al. |
| 2014/0267666 A1* | 9/2014 | Holz .................. G06K 9/00355 348/77 |
| 2014/0282282 A1* | 9/2014 | Holz .................... G06F 3/0304 715/863 |
| 2014/0307920 A1 | 10/2014 | Holz |
| 2014/0364212 A1 | 12/2014 | Osman et al. |
| 2014/0375547 A1 | 12/2014 | Katz et al. |
| 2014/0376773 A1* | 12/2014 | Holz .................. G06K 9/00342 382/103 |
| 2015/0003673 A1 | 1/2015 | Fletcher |
| 2015/0009149 A1 | 1/2015 | Gharib et al. |
| 2015/0016777 A1 | 1/2015 | Abovitz et al. |
| 2015/0022447 A1 | 1/2015 | Hare et al. |
| 2015/0029091 A1 | 1/2015 | Nakashima et al. |
| 2015/0115802 A1 | 4/2015 | Kuti et al. |
| 2015/0116214 A1 | 4/2015 | Grunnet-Jepsen et al. |
| 2015/0131859 A1 | 5/2015 | Kim et al. |
| 2015/0172539 A1 | 6/2015 | Neglur |
| 2015/0198716 A1* | 7/2015 | Romano .................. G01S 7/48 356/614 |
| 2015/0227795 A1* | 8/2015 | Starner ............ G06K 9/00671 345/156 |
| 2015/0253428 A1* | 9/2015 | Holz ................... G01S 17/42 356/5.01 |
| 2015/0261291 A1 | 9/2015 | Mikhailov et al. |
| 2015/0304593 A1 | 10/2015 | Sakai |
| 2015/0323785 A1 | 11/2015 | Fukata et al. |
| 2015/0363001 A1* | 12/2015 | Malzbender ............ G06F 3/017 706/18 |
| 2016/0062573 A1 | 3/2016 | Dascola et al. |
| 2016/0086046 A1* | 3/2016 | Holz ..................... H04N 5/232 382/103 |
| 2016/0086055 A1* | 3/2016 | Holz ..................... H04N 5/232 382/103 |
| 2016/0147376 A1* | 5/2016 | Kim ...................... G06F 3/0425 345/175 |
| 2016/0323564 A1* | 11/2016 | Pacheco .............. H04N 13/0289 |
| 2016/0378294 A1* | 12/2016 | Wright ................ G06F 3/04812 715/851 |

FOREIGN PATENT DOCUMENTS

| | | |
|---|---|---|
| CN | 101729808 A | 6/2010 |
| CN | 101930610 A | 12/2010 |
| CN | 101951474 A | 1/2011 |
| CN | 102053702 A | 5/2011 |
| CN | 201859393 U | 6/2011 |
| CN | 102201121 A | 9/2011 |
| CN | 102236412 A | 11/2011 |
| DE | 4201934 A1 | 7/1993 |
| DE | 10326035 A1 | 1/2005 |
| DE | 102007015495 A1 | 10/2007 |
| DE | 102007015497 B4 | 1/2014 |
| EP | 0999542 A1 | 5/2000 |
| EP | 1477924 A2 | 11/2004 |
| EP | 1837665 A2 | 9/2007 |
| EP | 2369443 A2 | 9/2011 |
| GB | 2419433 A | 4/2006 |
| GB | 2480140 A | 11/2011 |
| GB | 2519418 A | 4/2015 |
| JP | H02236407 A | 9/1990 |
| JP | H08261721 A | 10/1996 |
| JP | 08-261721 | 11/1996 |
| JP | H09259278 A | 10/1997 |
| JP | 2000023038 A | 1/2000 |
| JP | 2002-133400 A | 5/2002 |
| JP | 2003256814 A | 9/2003 |
| JP | 2004246252 A | 9/2004 |
| JP | 2006019526 A | 1/2006 |
| JP | 2006259829 A | 9/2006 |
| JP | 2007272596 A | 10/2007 |
| JP | 2008227569 A | 9/2008 |
| JP | 2009031939 A | 2/2009 |
| JP | 2009037594 A | 2/2009 |
| JP | 2011010258 A | 1/2011 |
| JP | 2011065652 A | 3/2011 |
| JP | 4906960 B2 | 3/2012 |
| KR | 101092909 B1 | 6/2011 |
| RU | 2422878 C1 | 6/2011 |
| TW | 200844871 A | 11/2008 |
| WO | 9426057 A1 | 11/1994 |
| WO | 2004114220 A1 | 12/2004 |
| WO | 2006020846 A2 | 2/2006 |
| WO | 2007137093 A2 | 11/2007 |
| WO | 2010007662 A1 | 1/2010 |
| WO | 2010032268 A2 | 3/2010 |
| WO | 2010076622 A1 | 7/2010 |
| WO | 2010088035 A2 | 8/2010 |
| WO | 2010138741 A1 | 12/2010 |
| WO | 2011024193 A2 | 3/2011 |

(56) References Cited

FOREIGN PATENT DOCUMENTS

| WO | 2011036618 A2 | 3/2011 |
|---|---|---|
| WO | 2011044680 A1 | 4/2011 |
| WO | 2011045789 A1 | 4/2011 |
| WO | 2011119154 A1 | 9/2011 |
| WO | 2012027422 A2 | 3/2012 |
| WO | 2013109608 A2 | 7/2013 |
| WO | 2013109609 A2 | 7/2013 |
| WO | 2014208087 A1 | 12/2014 |
| WO | 2015026707 A1 | 2/2015 |

OTHER PUBLICATIONS

Davis et al., "Toward 3-D Gesture Recognition", International Journal of Pattern Recognition and Artificial Intelligence, vol. 13, No. 03, 1999, pp. 381-393.
Butail, S., et al., "Three-Dimensional Reconstruction of the Fast-Start Swimming Kinematics of Densely Schooling Fish," Journal of the Royal Society Interface, Jun. 3, 2011, retrieved from the Internet <http://www.ncbi.nlm.nih.gov/pubmed/21642367>, pp. 0, 1-12.
Kim, et al., "Development of an Orthogonal Double-Image Processing Algorithm to Measure Bubble," Department of Nuclear Engineering and Technology, Seoul National University Korea, vol. 39 No. 4, Published Jul. 6, 2007, pp. 313-326.
Barat et al., "Feature Correspondences From Multiple Views of Coplanar Ellipses", 2nd International Symposium on Visual Computing, Author Manuscript, 2006, 10 pages.
Cheikh et al., "Multipeople Tracking Across Multiple Cameras", International Journal on New Computer Architectures and Their Applications (IJNCAA), vol. 2, No. 1, 2012, pp. 23-33.
Rasmussen, Matthew K., "An Analytical Framework for the Preparation and Animation of a Virtual Mannequin forthe Purpose of Mannequin-Clothing Interaction Modeling", A Thesis Submitted in Partial Fulfillment of the Requirements for the Master of Science Degree in Civil and Environmental Engineering in the Graduate College of the University of Iowa, Dec. 2008, 98 pages.
Kulesza, et al., "Arrangement of a Multi Stereo Visual Sensor System for a Human Activities Space," Source: Stereo Vision, Book edited by: Dr. Asim Bhatti, ISBN 978-953-7619-22-0, Copyright Nov. 2008, I-Tech, Vienna, Austria, www.intechopen.com, pp. 153-173.
Heikkila, Janne, "Accurate Camera Calibration and Feature Based 3-D Reconstruction from Monocular Image Sequences", Infotech Oulu and Department of Electrical Engineering, University of Oulu, 1997, 129 pages.
Olsson, K., et al., "Shape from Silhouette Scanner—Creating a Digital 3D Model of a Real Object by Analyzing Photos From Multiple Views," University of Linkoping, Sweden, Copyright VCG 2001, Retrieved from the Internet: <http://liu.diva-portal.org/smash/get/diva2:18671/FULLTEXT01> on Jun. 17, 2013, 52 pages.
Forbes, K., et al., "Using Silhouette Consistency Constraints to Build 3D Models," University of Cape Town, Copyright De Beers 2003, Retrieved from the internet: <http://www.dip.ee.uct.ac.za/~kforbes/Publications/Forbes2003Prasa.pdf> on Jun. 17, 2013, 6 pages.
Cumani, A., et al., "Pattern Recognition: Recovering the 3D Structure of Tubular Objects From Stereo Silhouettes," Pattern Recognition, Elsevier, GB, vol. 30, No. 7, Jul. 1, 1997, Retrieved from the Internet: <http://www.sciencedirect.com/science/article/pii/S0031320396001446>, pp. 1051-1059.
May, S., et al., "Robust 3D-Mapping with Time-of-Flight Cameras," 2009 IEEE/RSJ International Conference on Intelligent Robots and Systems, Piscataway, NJ, USA, Oct. 10, 2009, pp. 1673-1678.
Kanhangad, V., et al., "A Unified Framework for Contactless Hand Verification," IEEE Transactions on Information Forensics and Security, IEEE, Piscataway, NJ, US., vol. 6, No. 3, Sep. 1, 2011, pp. 1014-1027.
Di Zenzo, S., et al., "Advances in Image Segmentation," Image and Vision Computing, Elsevier, Guildford, GBN, vol. 1, No. 1, Copyright Butterworth & Co Ltd., Nov. 1, 1983, pp. 196-210.
Arthington, et al., "Cross-section Reconstruction During Uniaxial Loading," Measurement Science and Technology, vol. 20, No. 7, Jun. 10, 2009, Retrieved from the Internet: http:iopscience.iop.org/0957-0233/20/7/075701, pp. 1-9.
Pedersini, et al., Accurate Surface Reconstruction from Apparent Contours, Sep. 5-8, 2000 European Signal Processing Conference EUSIPCO 2000, vol. 4, Retrieved from the Internet: http://home.deib.polimi.it/sarti/CV_and_publications.html, pp. 1-4.
Chung, et al., "International Journal of Computer Vision: RecoveringLSHGCs and SHGCs from Stereo" [on-line], Oct. 1996 [retrieved on Apr. 10, 2014], Kluwer Academic Publishers, vol. 20, issue 1-2, Retrieved from the Internet: http://link.springer.com/article/10.1007/BF00144116#, pp. 43-58.
Bardinet, et al., "Fitting of iso-Surfaces Using Superquadrics and Free-Form Deformations" [on-line], Jun. 24-25, 1994 [retrieved Jan. 9, 2014], 1994 Proceedings of IEEE Workshop on Biomedical Image Analysis, Retrieved from the Internet: http://ieeexplore.ieee.org/xpls/abs_all.jsp?arnumber=315882&tag=1, pp. 184-193.
U.S. Appl. No. 13/742,845—Office Action dated Jul. 22, 2013, 19 pages.
U.S. Appl. No. 13/742,845—Notice of Allowance dated Dec. 5, 2013, 11 pages.
U.S. Appl. No. 13/742,953—Office Action dated Jun. 14, 2013, 13 pages.
U.S. Appl. No. 13/742,953—Notice of Allowance dated Nov. 4, 2013, 14 pages.
PCT/US2013/021709—International Preliminary Report on Patentability dated Jul. 22, 2014, 22 pages (WO 2013/109608).
PCT/US2013/021713—International Preliminary Report on Patentability dated Jul. 22, 2014, 13 pages.
U.S. Appl. No. 13/414,485—Office Action dated May 19, 2014, 16 pages.
U.S. Appl. No. 13/414,485—Final Office Action dated Feb. 12, 2015, 30 pages.
PCT/US2013/021709—International Search Report and Written Opinion dated Sep. 12, 2013, 22 pages.
PCT/US2013/021713—International Search Report and Written Opinion dated Sep. 11, 2013, 7 pages.
U.S. Appl. No. 14/106,148—Office Action dated Jul. 6, 2015, 12 pages.
PCT/US2013/069231—International Search Report and Written Opinion mailed Mar. 13, 2014, 7 pages.
U.S. Appl. No. 13/744,810—Office Action dated Jun. 7, 2013, 15 pages.
U.S. Appl. No. 13/744,810—Final Office Action dated Dec. 16, 2013, 18 pages.
Texas Instruments, "QVGA 3D Time-of-Flight Sensor," Product Overview: OPT 8140, Dec. 2013, Texas Instruments Incorporated, 10 pages.
Texas Instruments, "4-Channel, 12-Bit, 80-MSPS ADC," VSP5324, Revised Nov. 2012, Texas Instruments Incorporated, 55 pages.
Texas Instruments, "Time-of-Flight Controller (TFC)," Product Overview; OPT9220, Jan. 2014, Texas Instruments Incorporated, 43 pages.
PCT/US2013/069231—International Preliminary Report with Written Opinion dated May 12, 2015, 8 pages.
U.S. Appl. No. 14/250,758—Office Action dated Jul. 6, 2015, 8 pages.
U.S. Appl. No. 13/414,485—Office Action dated Jul. 30, 2015, 22 pages.
U.S. Appl. No. 14/106,148—Notice of Allowance dated Dec. 2, 2015, 41 pages.
CN 2013800122765—Office Action dated Nov. 2, 2015, 17 pages.
U.S. Appl. No. 14/959,880—Notice of Allowance dated Mar. 2, 2016, 51 pages.
Matsuyama et al. "Real-Time Dynamic 3-D Object Shape Reconstruction and High-Fidelity Texture Mapping for 3-D Video," IEEE Transactions on Circuits and Systems for Video Technology, vol. 14, No. 3, Mar. 2004, pp. 357-369.
Fukui et al. "Multiple Object Tracking System with Three Level Continuous Processes" IEEE, 1992, pp. 19-27.
U.S. Appl. No. 14/250,758—Final Office Action dated Mar. 10, 2016, 10 pages.

(56) References Cited

OTHER PUBLICATIONS

Mendez, et al., "Importance Masks for Revealing Occluded Objects in Augmented Reality," Proceedings of the 16th ACM Symposium on Virtual Reality Software and Technology, 2 pages, ACM, 2009.
U.S. Appl. No. 13/414,485—Office Action dated Apr. 21, 2016, 24 pages.
U.S. Appl. No. 14/710,512—Notice of Allowance mailed Apr. 28, 2016, 25 pages.
U.S. Appl. No. 14/959,891—Office Action dated Apr. 11, 2016, 47 pages.
U.S. Appl. No. 14/250,758—Response to Final Office Action dated Mar. 10, 2016 filed May 5, 2016, 12 pages.
U.S. Appl. No. 14/106,148—Response to Office Action dated Jul. 6, 2015 filed Nov. 6, 2015, 41 pages.
U.S. Appl. No. 14/959,880—Notice of Allowance dated Jul. 12, 2016, 22 pages.
U.S. Appl. No. 14/106,148—Notice of Allowance dated Jul. 20, 2016, 30 pages.
U.S. Appl. No. 14/959,891—Notice of Allowance dated Jul. 28, 2016, 19 pages.
JP 2014-552391—First Office Action dated Dec. 9, 2014, 6 pages.
U.S. Appl. No. 13/742,845—Response to Office Action dated Jul. 22, 2013 filed Sep. 26, 2013, 7 pages.
U.S. Appl. No. 14/959,891—Response to Office Action dated Apr. 11, 2016 filed Jun. 8, 2016, 25 pages.
DE 11 2013 000 590.5—First Office Action dated Nov. 5, 2014, 7 pages.
DE 11 2013 000 590.5—Response to First Office Action dated Nov. 5, 2014 filed Apr. 24, 2015, 1 page.
DE 11 2013 000 590.5—Second Office Action dated Apr. 29, 2015, 7 pages.
DE 11 2013 000 590.5—Response to Second Office Action dated Apr. 29, 2015 filed Sep. 16, 2015, 11 pages.
DE 11 2013 000 590.5—Third Office Action dated Sep. 28, 2015, 4 pages.
DE 11 2013 000 590.5—Response to Third Office Action dated Sep. 28, 2015 filed Dec. 14, 2015, 64 pages.
DE 11 2013 000 590.5—Notice of Allowance dated Jan. 18, 2016, 8 pages.
CN 2013800122765—Response to First Office Action dated Nov. 2, 2015 filed May 14, 2016, 14 pages.
JP 2014-552391—Response to First Office Action dated Dec. 9, 2014 filed Jun. 8, 2016, 9 pages.
JP 2014-552391—Second Office Action dated Jul. 7, 2015, 7 pages.
JP 2014-552391—Response to Second Office Action dated Jul. 7, 2015 filed Dec. 25, 2015, 4 pages.
JP 2014-552391—Third Office Action dated Jan. 26, 2016, 5 pages.
CN 2013800122765—Second Office Action dated Jul. 27, 2016, 6 pages.
U.S. Appl. No. 14/250,758—Office Action dated Sep. 8, 2016, 9 pages.
U.S. Appl. No. 14/710,499—Notice of Allowacne dated Sep. 12, 2016, 28 pages.
U.S. Appl. No. 14/710,499—Office Action dated Apr. 14, 2016, 30 pages.
U.S. Appl. No. 14/710,499—Response to Office Action dated Apr. 14, 2016 filed Jul. 14, 2016, 37 pages.

\* cited by examiner

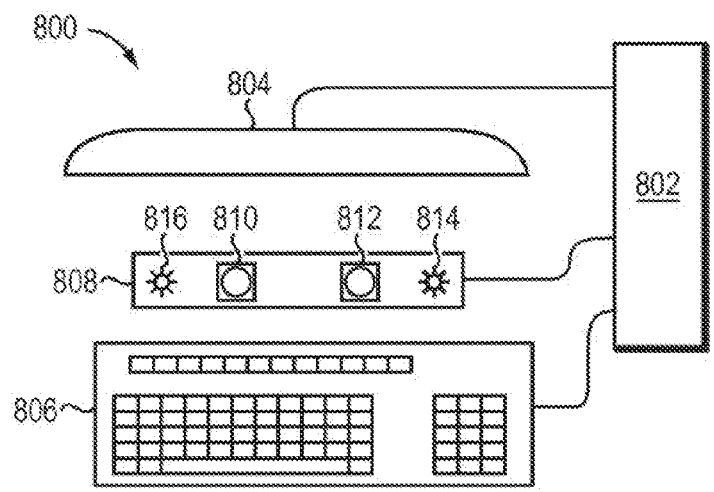
FIG. 8
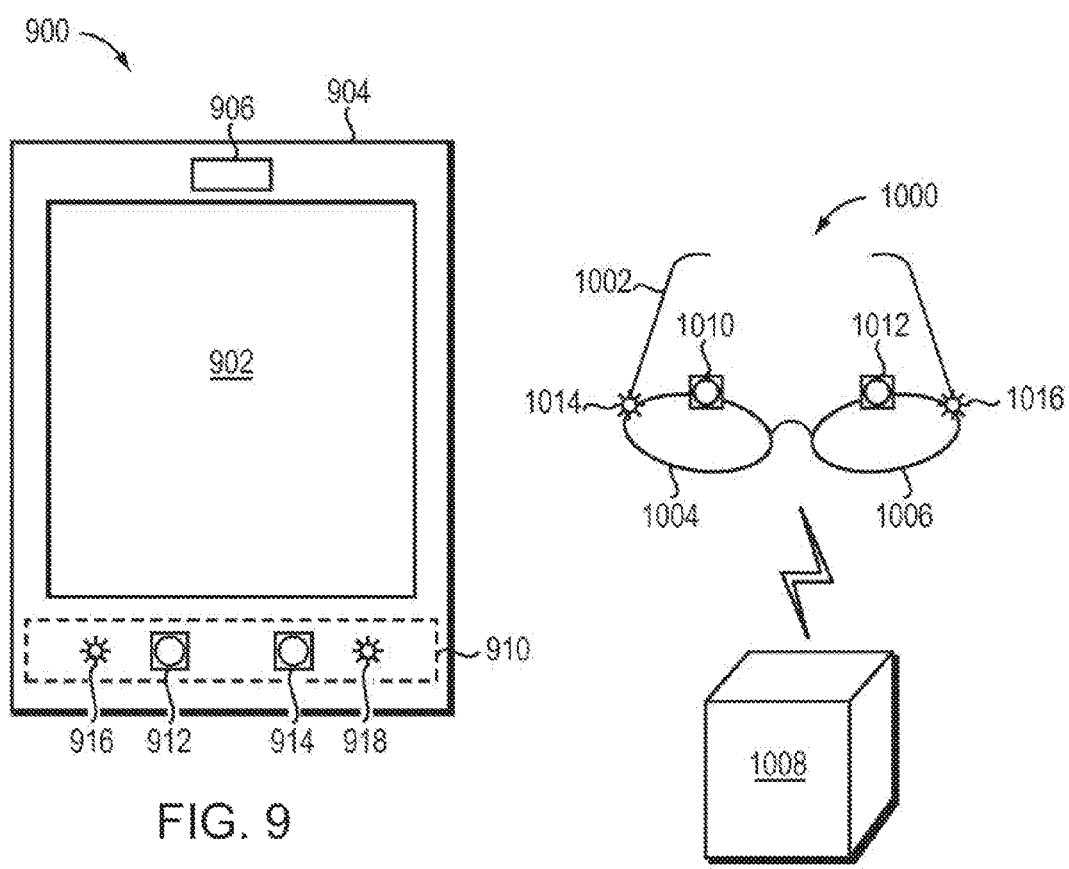
FIG. 9
FIG. 10

ENHANCED CONTRAST FOR OBJECT DETECTION AND CHARACTERIZATION BY OPTICAL IMAGING BASED ON DIFFERENCES BETWEEN IMAGES

CROSS-REFERENCE TO RELATED APPLICATIONS

This application is a continuation of U.S. patent application Ser. No. 14/959,891, titled "ENHANCED CONTRAST FOR OBJECT DETECTION AND CHARACTERIZATION BY OPTICAL IMAGING BASED ON DIFFERENCES BETWEEN IMAGES", filed 4 Dec. 2015, by David Holz and Hua Yang, which is a continuation of U.S. patent application Ser. No. 14/106,148, titled "ENHANCED CONTRAST FOR OBJECT DETECTION AND CHARACTERIZATION BY OPTICAL IMAGING", filed 13 Dec. 2013, by David Holz and Hua Yang, which is a continuation of U.S. patent application Ser. No. 13/742,845, titled "ENHANCED CONTRAST FOR OBJECT DETECTION AND CHARACTERIZATION BY OPTICAL IMAGING", filed 16 Jan. 2013, by David Holz and Hua Yang, now U.S. Pat. No. 8,693,731, issued 8 Apr. 2014, which is a continuation-in-part of U.S. patent application Ser. No. 13/724,357, titled "SYSTEMS AND METHODS FOR CAPTURING MOTION IN THREE-DIMENSIONAL SPACE", filed 21 Dec. 2012, by David Holz, now U.S. Pat. No. 9,070,019, issued 30 Jun. 2015 and a is continuation-in-part of U.S. Ser. No. 13/414,485, titled "MOTION CAPTURE USING CROSS-SECTIONS OF AN OBJECT", filed 7 Mar. 2012, by David Holz.

Said U.S. Ser. No. 13/742,845 claims priority to U.S. Provisional Patent Application No. 61/587,554, titled "METHODS AND SYSTEMS FOR IDENTIFYING POSITION AND SHAPE OF OBJECTS IN THREE-DIMENSIONAL SPACE", filed 17 Jan. 2012, by David Holz, to U.S. Provisional Patent Application No. 61/724,091, titled "SYSTEMS AND METHODS FOR CAPTURING MOTION IN THREE-DIMENSIONAL SPACE", filed 8 Nov. 2012, by David Holz and to U.S. Provisional Patent Application No. 61/724,068, titled "ENHANCED CONTRAST FOR OBJECT DETECTION AND CHARACTERIZATION BY OPTICAL IMAGING", filed 8 Nov. 2012, by David Holz.

Said U.S. Ser. No. 13/724,357 is a continuation-in-part of U.S. patent application Ser. No. 13/414,485, and also claims priority to U.S. Provisional Patent Application No. 61/724,091, and to U.S. Provisional Patent Application No. 61/587,554

Said U.S. Ser. No. 13/414,485 claims priority to U.S. Provisional Patent Application No. 61/587,554.

Each of the priority applications are incorporated herein by reference in their entirety.

FIELD OF THE INVENTION

The present disclosure relates generally to imaging systems and in particular to three-dimensional (3D) object detection, tracking and characterization using optical imaging.

BACKGROUND

Motion-capture systems are used in a variety of contexts to obtain information about the conformation and motion of various objects, including objects with articulating members, such as human hands or human bodies. Such systems generally include cameras to capture sequential images of an object in motion and computers to analyze the images to create a reconstruction of an object's volume, position and motion. For 3D motion capture, at least two cameras are typically used.

Image-based motion-capture systems rely on the ability to distinguish an object of interest from a background. This is often achieved using image-analysis algorithms that detect edges, typically by comparing pixels to detect abrupt changes in color and/or brightness. Such conventional systems, however, suffer performance degradation under many common circumstances, e.g., low contrast between the object of interest and the background and/or patterns in the background that may falsely register as object edges.

In some instances, distinguishing object and background can be facilitated by "instrumenting" the object of interest, e.g., by having a person wear a mesh of reflectors or active light sources or the like while performing the motion. Special lighting conditions (e.g., low light) can be used to make the reflectors or light sources stand out in the images. Instrumenting the subject, however, is not always a convenient or desirable option.

SUMMARY

Certain embodiments of the present invention relate to imaging systems that improve object recognition by enhancing contrast between the object and background surfaces visible in an image using; this may be accomplished, for example, by means of controlled lighting directed at the object. For example, in a motion-capture system where an object of interest, such as a person's hand, is significantly closer to the camera than any background surfaces, the falloff of light intensity with distance (1/r2 for pointlike light sources) can be exploited by positioning a light source (or multiple light sources) near the camera(s) or other image capture device(s) and shining that light onto the object. Source light reflected by the nearby object of interest can be expected to be much brighter than light reflected from more distant background surfaces, and the more distant the background (relative to the object), the more pronounced the effect will be. Accordingly, in some embodiments, a threshold cutoff on pixel brightness in the captured images can be used to distinguish "object" pixels from "background" pixels. While broadband ambient light sources can be employed, various embodiments employ light having a confined wavelength range and a camera matched to detect such light; for example, an infrared source light can be used with one or more cameras sensitive to infrared frequencies.

Accordingly, in a first aspect, the invention pertains to an image capture and analysis system for identifying objects of interest in a digitally represented image scene. In various embodiments, the system comprises at least one camera oriented toward a field of view; at least one light source disposed on a same side of the field of view as the camera and oriented to illuminate the field of view; and an image analyzer coupled to the camera and the light source(s). The image analyzer may be configured to operate the camera(s) to capture a sequence of images including a first image captured at a time when the light source(s) are illuminating the field of view; identify pixels corresponding to the object rather than to the background (e.g., image components that are nearby or reflective); and based on the identified pixels, constructing a 3D model of the object, including a position and shape of the object, to geometrically determine whether it corresponds to the object of interest. In certain embodiments, the image analyzer distinguishes between (i) foreground image components corresponding to objects located within a proximal zone of the field of view, where the proximal zone extends from the camera(s) and has a depth relative thereto of at least twice the expected maximum distance between the objects corresponding to the foreground image components and the camera(s), and (ii) background image components corresponding to objects located within a distal zone of the field of view, where the distal zone is located, relative to the at least one camera, beyond the proximal zone. For example, the proximal zone may have a depth of at least four times the expected maximum distance.

In other embodiments, the image analyzer operates the camera(s) to capture second and third images when the light source(s) are not illuminating the field of view and identifies the pixels corresponding to the object based on the difference between the first and second images and the difference between the first and third images, where the second image is captured before the first image and the third image is captured after the second image.

The light source(s) may, for example, be diffuse emitters—e.g., infrared light-emitting diodes, in which case the camera(s) are an infrared-sensitive camera. Two or more light sources may be arranged to flank the camera(s) and be substantially coplanar therewith. In various embodiments, the camera(s) and the light source(s) are oriented vertically upward. To enhance contrast, the camera may be operated to provide an exposure time no greater than 100 microseconds and the light source(s) may be activated during exposure time at a power level of at least 5 watts. In certain implementations, a holographic diffraction grating is positioned between the lens of each camera and the field of view (i.e., in front of the camera lens).

The image analyzer may geometrically determine whether an object corresponds to the object of interest by identifying ellipses that volumetrically define a candidate object, discarding object segments geometrically inconsistent with an ellipse-based definition, and determining, based on the ellipses, whether the candidate object corresponds to the object of interest.

In another aspect, the invention pertains to a method for capturing and analyzing images. In various embodiments, the method comprises the steps of activating at least one light source to illuminate a field of view containing an object of interest; capturing a sequence of digital images of the field of view using a camera (or cameras) at a time when the light source(s) are activated; identifying pixels corresponding to the object rather than to the background; and based on the identified pixels, constructing a 3D model of the object, including a position and shape of the object, to geometrically determine whether it corresponds to the object of interest.

The light source(s) may be positioned such that objects of interest are located within a proximal zone of the field of view, where the proximal zone extends from the camera to a distance at least twice an expected maximum distance between the objects of interest and the camera. For example, the proximal zone may have a depth of at least four times the expected maximum distance. The light source(s) may, for example, be diffuse emitters—e.g., infrared light-emitting diodes, in which case the camera is an infrared-sensitive camera. Two or more light sources may be arranged to flank the camera and be substantially coplanar therewith. In various embodiments, the camera and the light source(s) are oriented vertically upward. To enhance contrast, the camera may be operated to provide an exposure time no greater than 100 microseconds and the light source(s) may be activated during exposure time at a power level of at least 5 watts.

Alternatively, object pixels may be identified by capturing a first image when the light source(s) are not activated, a second image when the light source(s) are activated, and a third image when the light source(s) are not activated, where pixels corresponding to the object are identified based on a difference between the second and first images and a difference between the second and third images.

Geometrically determining whether an object corresponds to the object of interest may comprise or consist of identifying ellipses that volumetrically define a candidate object, discarding object segments geometrically inconsistent with an ellipse-based definition, and determining, based on the ellipses, whether the candidate object corresponds to the object of interest.

In still another aspect the invention pertains to a method of locating rounded objects within a digital image. In various embodiments, the method comprises the steps of: activating at least one light source to illuminate a field of view containing an object of interest; operating a camera to capture a sequence of images including a first image captured at a time when the at least one light source is illuminating the field of view; and analyzing the images to detect therein Gaussian brightness falloff patterns indicative of rounded objects in the field of view. In some embodiments, the rounded objects are detected without identifying edges thereof. The method may further comprise tracking the motion of the detected rounded objects through a plurality of the captured images.

Another aspect of the invention relates to an image capture and analysis system for locating rounded objects within a field of view. In various embodiments, the system comprises at least one camera oriented toward the field of view; at least one light source disposed on a same side of the field of view as the camera and oriented to illuminate the field of view; and an image analyzer coupled to the camera and the light source. The image analyzer may be configured to operate the camera(s) to capture a sequence of images including a first image captured at a time when the light source(s) are illuminating the field of view; and analyze the images to detect therein Gaussian brightness falloff patterns indicative of rounded objects in the field of view. The rounded objects may, in some embodiments, be detected without identifying edges thereof. The system may track the motion of the detected rounded objects through a plurality of the captured images.

As used herein, the term "substantially" or "approximately" means±10% (e.g., by weight or by volume), and in some embodiments, ±5%. The term "consists essentially of" means excluding other materials that contribute to function, unless otherwise defined herein. Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

The following detailed description together with the accompanying drawings will provide a better understanding of the nature and advantages of the present invention.

BRIEF DESCRIPTION OF THE DRAWINGS

FIG. 8 is a top view of a computer system incorporating a motion detector as a user input device according to an embodiment of the present invention.

FIG. 9 is a front view of a tablet computer illustrating another example of a computer system incorporating a motion detector according to an embodiment of the present invention.

FIG. 10 illustrates a goggle system incorporating a motion detector according to an embodiment of the present invention.

DETAILED DESCRIPTION

Figure 1:
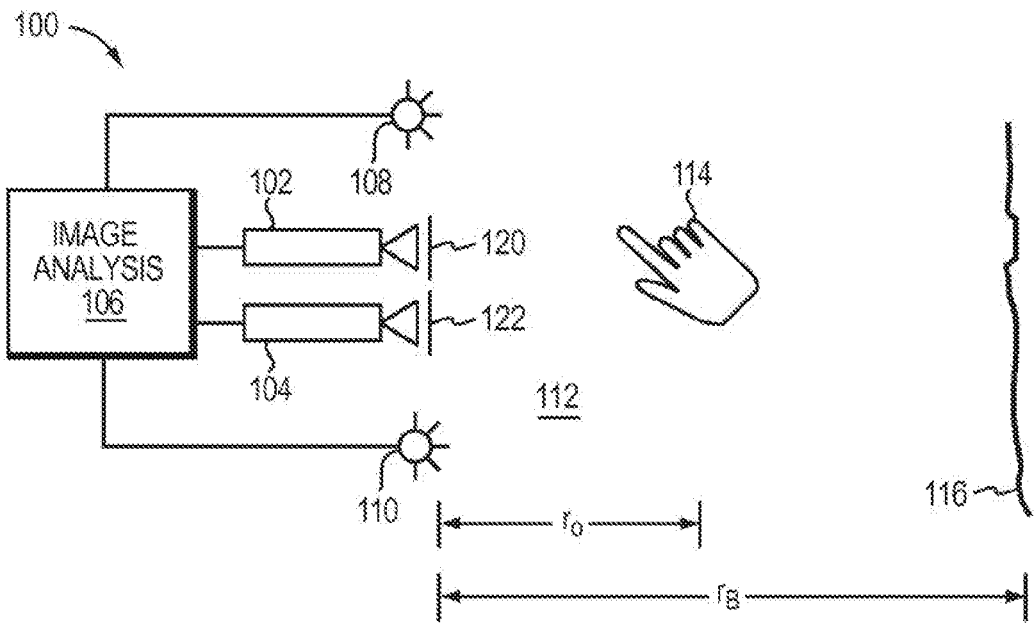
FIG. 1 illustrates a system for capturing image data according to an embodiment of the present invention.

Refer first to FIG. 1, which illustrates a system 100 for capturing image data according to an embodiment of the present invention. System 100 includes a pair of cameras 102, 104 coupled to an image-analysis system 106. Cameras 102, 104 can be any type of camera, including cameras sensitive across the visible spectrum or, more typically, with enhanced sensitivity to a confined wavelength band (e.g., the infrared (IR) or ultraviolet bands); more generally, the term "camera" herein refers to any device (or combination of devices) capable of capturing an image of an object and representing that image in the form of digital data. For example, line sensors or line cameras rather than conventional devices that capture a two-dimensional (2D) image can be employed. The term "light" is used generally to connote any electromagnetic radiation, which may or may not be within the visible spectrum, and may be broadband (e.g., white light) or narrowband (e.g., a single wavelength or narrow band of wavelengths).

The heart of a digital camera is an image sensor, which contains a grid of light-sensitive picture elements (pixels). A lens focuses light onto the surface of the image sensor, and the image is formed as the light strikes the pixels with varying intensity. Each pixel converts the light into an electric charge whose magnitude reflects the intensity of the detected light, and collects that charge so it can be measured. Both CCD and CMOS image sensors perform this same function but differ in how the signal is measured and transferred.

In a CCD, the charge from each pixel is transported to a single structure that converts the charge into a measurable voltage. This is done by sequentially shifting the charge in each pixel to its neighbor, row by row and then column by column in "bucket brigade" fashion, until it reaches the measurement structure. A CMOS sensor, by contrast, places a measurement structure at each pixel location. The measurements are transferred directly from each location to the output of the sensor.

Cameras 102, 104 are preferably capable of capturing video images (i.e., successive image frames at a constant rate of at least 15 frames per second), although no particular frame rate is required. The capabilities of cameras 102, 104 are not critical to the invention, and the cameras can vary as to frame rate, image resolution (e.g., pixels per image), color or intensity resolution (e.g., number of bits of intensity data per pixel), focal length of lenses, depth of field, etc. In general, for a particular application, any cameras capable of focusing on objects within a spatial volume of interest can be used. For instance, to capture motion of the hand of an otherwise stationary person, the volume of interest might be defined as a cube approximately one meter on a side.

System 100 also includes a pair of light sources 108, 110, which can be disposed to either side of cameras 102, 104, and controlled by image-analysis system 106. Light sources 108, 110 can be infrared light sources of generally conventional design, e.g., infrared light-emitting diodes (LEDs), and cameras 102, 104 can be sensitive to infrared light. Filters 120, 122 can be placed in front of cameras 102, 104 to filter out visible light so that only infrared light is registered in the images captured by cameras 102, 104. In some embodiments where the object of interest is a person's hand or body, use of infrared light can allow the motion-capture system to operate under a broad range of lighting conditions and can avoid various inconveniences or distractions that may be associated with directing visible light into the region where the person is moving. However, a particular wavelength or region of the electromagnetic spectrum is required.

It should be stressed that the foregoing arrangement is representative and not limiting. For example, lasers or other light sources can be used instead of LEDs. For laser setups, additional optics (e.g., a lens or diffuser) may be employed to widen the laser beam (and make its field of view similar to that of the cameras). Useful arrangements can also include short- and wide-angle illuminators for different ranges. Light sources are typically diffuse rather than specular point sources; for example, packaged LEDs with light-spreading encapsulation are suitable.

In operation, cameras 102, 104 are oriented toward a region of interest 112 in which an object of interest 114 (in this example, a hand) and one or more background objects 116 can be present. Light sources 108, 110 are arranged to illuminate region 112. In some embodiments, one or more of the light sources 108, 110 and one or more of the cameras 102, 104 are disposed below the motion to be detected, e.g., where hand motion is to be detected, beneath the spatial region where that motion takes place. This is an optimal location because the amount of information recorded about the hand is proportional to the number of pixels it occupies in the camera images, the hand will occupy more pixels when the camera's angle with respect to the hand's "pointing direction" is as close to perpendicular as possible. Because it is uncomfortable for a user to orient his palm toward a screen, the optimal positions are either from the bottom looking up, from the top looking down (which requires a bridge) or from the screen bezel looking diagonally up or diagonally down. In scenarios looking up there is less likelihood of confusion with background objects (clutter on the user's desk, for example) and if it is directly looking up then there is little likelihood of confusion with other people out of the field of view (and also privacy is enhanced by not imaging faces). Image-analysis system 106, which can be, e.g., a computer system, can control the operation of light sources 108, 110 and cameras 102, 104 to capture images of region 112. Based on the captured images, image-analysis system 106 determines the position and/or motion of object 114.

For example, as a step in determining the position of object 114, image-analysis system 106 can determine which pixels of various images captured by cameras 102, 104 contain portions of object 114. In some embodiments, any pixel in an image can be classified as an "object" pixel or a "background" pixel depending on whether that pixel contains a portion of object 114 or not. With the use of light sources 108, 110, classification of pixels as object or background pixels can be based on the brightness of the pixel. For example, the distance ($r_O$) between an object of interest 114 and cameras 102, 104 is expected to be smaller than the distance ($r_B$) between background object(s) 116 and cameras 102, 104. Because the intensity of light from sources 108, 110 decreases as $1/r^2$, object 114 will be more brightly lit than background 116, and pixels containing portions of object 114 (i.e., object pixels) will be correspondingly brighter than pixels containing portions of background 116 (i.e., background pixels). For example, if $r_B/r_O=2$, then object pixels will be approximately four times brighter than background pixels, assuming object 114 and background 116 are similarly reflective of the light from sources 108, 110, and further assuming that the overall illumination of region 112 (at least within the frequency band captured by cameras 102, 104) is dominated by light sources 108, 110. These assumptions generally hold for suitable choices of cameras 102, 104, light sources 108, 110, filters 120, 122, and objects commonly encountered. For example, light sources 108, 110 can be infrared LEDs capable of strongly emitting radiation in a narrow frequency band, and filters 120, 122 can be matched to the frequency band of light sources 108, 110. Thus, although a human hand or body, or a heat source or other object in the background, may emit some infrared radiation, the response of cameras 102, 104 can still be dominated by light originating from sources 108, 110 and reflected by object 114 and/or background 116.

In this arrangement, image-analysis system 106 can quickly and accurately distinguish object pixels from background pixels by applying a brightness threshold to each pixel. For example, pixel brightness in a CMOS sensor or similar device can be measured on a scale from 0.0 (dark) to 1.0 (fully saturated), with some number of gradations in between depending on the sensor design. The brightness encoded by the camera pixels scales standardly (linearly) with the luminance of the object, typically due to the deposited charge or diode voltages. In some embodiments, light sources 108, 110 are bright enough that reflected light from an object at distance $r_O$ produces a brightness level of 1.0 while an object at distance $r_B=2r_O$ produces a brightness level of 0.25. Object pixels can thus be readily distinguished from background pixels based on brightness. Further, edges of the object can also be readily detected based on differences in brightness between adjacent pixels, allowing the position of the object within each image to be determined. Correlating object positions between images from cameras 102, 104 allows image-analysis system 106 to determine the location in 3D space of object 114, and analyzing sequences of images allows image-analysis system 106 to reconstruct 3D motion of object 114 using conventional motion algorithms.

It will be appreciated that system 100 is illustrative and that variations and modifications are possible. For example, light sources 108, 110 are shown as being disposed to either side of cameras 102, 104. This can facilitate illuminating the edges of object 114 as seen from the perspectives of both cameras; however, a particular arrangement of cameras and lights is not required. (Examples of other arrangements are described below.) As long as the object is significantly closer to the cameras than the background, enhanced contrast as described herein can be achieved.

Figure 2:
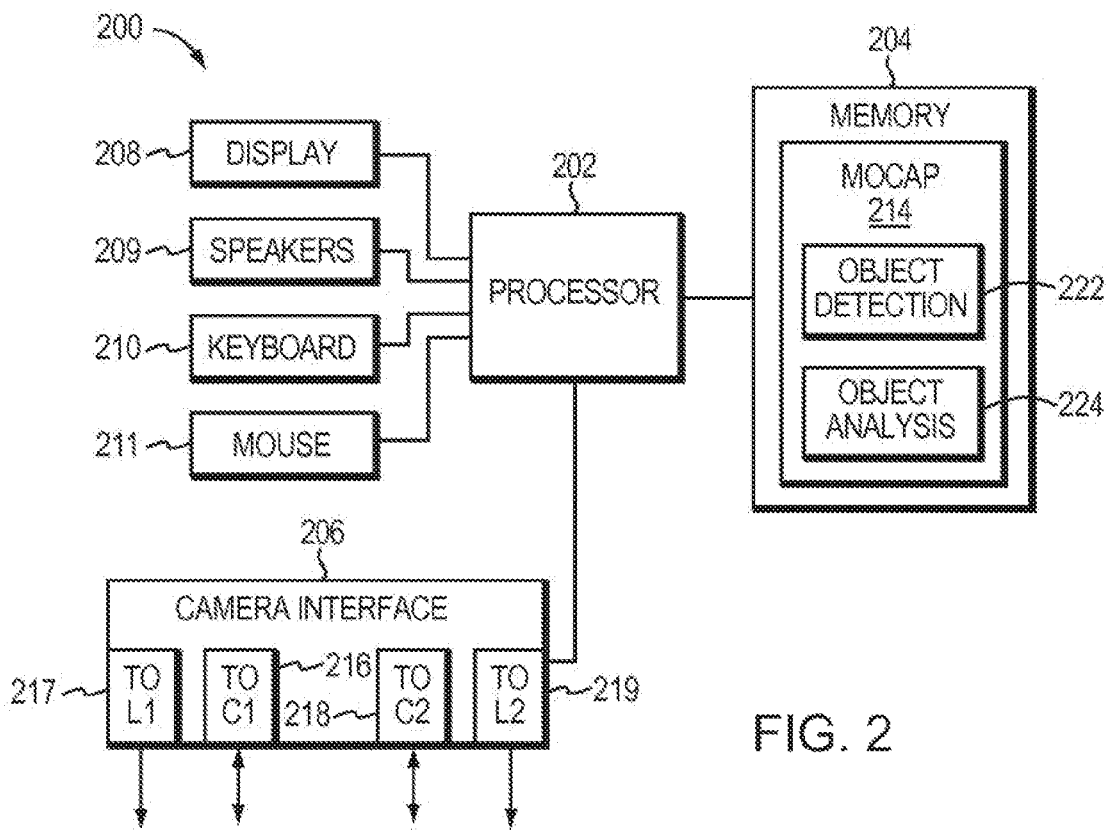
FIG. 2 is a simplified block diagram of a computer system implementing an image analysis apparatus according to an embodiment of the present invention.

Image-analysis system 106 (also referred to as an image analyzer) can include or consist of any device or device component that is capable of capturing and processing image data, e.g., using techniques described herein. FIG. 2 is a simplified block diagram of a computer system 200, implementing image-analysis system 106 according to an embodiment of the present invention. Computer system 200 includes a processor 202, a memory 204, a camera interface 206, a display 208, speakers 209, a keyboard 210, and a mouse 211.

Memory 204 can be used to store instructions to be executed by processor 202 as well as input and/or output data associated with execution of the instructions. In particular, memory 204 contains instructions, conceptually illustrated as a group of modules described in greater detail below, that control the operation of processor 202 and its interaction with the other hardware components. An operating system directs the execution of low-level, basic system functions such as memory allocation, file management and operation of mass storage devices. The operating system may be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MACINTOSH operating system, the APACHE operating system, an OPENSTEP operating system or another operating system of platform.

The computing environment may also include other removable/nonremovable, volatile/nonvolatile computer storage media. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD-ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

Processor 202 may be a general-purpose microprocessor, but depending on implementation can alternatively be a microcontroller, peripheral integrated circuit element, a CSIC (customer-specific integrated circuit), an ASIC (application-specific integrated circuit), a logic circuit, a digital signal processor, a programmable logic device such as an FPGA (field-programmable gate array), a PLD (programmable logic device), a PLA (programmable logic array), an RFID processor, smart chip, or any other device or arrangement of devices that is capable of implementing the steps of the processes of the invention.

Camera interface 206 can include hardware and/or software that enables communication between computer system 200 and cameras such as cameras 102, 104 shown in FIG. 1, as well as associated light sources such as light sources 108, 110 of FIG. 1. Thus, for example, camera interface 206 can include one or more data ports 216, 218 to which cameras can be connected, as well as hardware and/or software signal processors to modify data signals received from the cameras (e.g., to reduce noise or reformat data) prior to providing the signals as inputs to a conventional motion-capture ("mocap") program 214 executing on processor 202. In some embodiments, camera interface 206 can also transmit signals to the cameras, e.g., to activate or deactivate the cameras, to control camera settings (frame rate, image quality, sensitivity, etc.), or the like. Such signals can be transmitted, e.g., in response to control signals from processor 202, which may in turn be generated in response to user input or other detected events.

Camera interface 206 can also include controllers 217, 219, to which light sources (e.g., light sources 108, 110) can be connected. In some embodiments, controllers 217, 219 supply operating current to the light sources, e.g., in response to instructions from processor 202 executing mocap program 214. In other embodiments, the light sources can draw operating current from an external power supply (not shown), and controllers 217, 219 can generate control signals for the light sources, e.g., instructing the light sources to be turned on or off or changing the brightness. In some embodiments, a single controller can be used to control multiple light sources.

Instructions defining mocap program 214 are stored in memory 204, and these instructions, when executed, perform motion-capture analysis on images supplied from cameras connected to camera interface 206. In one embodiment, mocap program 214 includes various modules, such as an object detection module 222 and an object analysis module 224; again, both of these modules are conventional and well-characterized in the art. Object detection module 222 can analyze images (e.g., images captured via camera interface 206) to detect edges of an object therein and/or other information about the object's location. Object analysis module 224 can analyze the object information provided by object detection module 222 to determine the 3D position and/or motion of the object. Examples of operations that can be implemented in code modules of mocap program 214 are described below. Memory 204 can also include other information and/or code modules used by mocap program 214.

Display 208, speakers 209, keyboard 210, and mouse 211 can be used to facilitate user interaction with computer system 200. These components can be of generally conventional design or modified as desired to provide any type of user interaction. In some embodiments, results of motion capture using camera interface 206 and mocap program 214 can be interpreted as user input. For example, a user can perform hand gestures that are analyzed using mocap program 214, and the results of this analysis can be interpreted as an instruction to some other program executing on processor 200 (e.g., a web browser, word processor, or other application). Thus, by way of illustration, a user might use upward or downward swiping gestures to "scroll" a webpage currently displayed on display 208, to use rotating gestures to increase or decrease the volume of audio output from speakers 209, and so on.

It will be appreciated that computer system 200 is illustrative and that variations and modifications are possible. Computer systems can be implemented in a variety of form factors, including server systems, desktop systems, laptop systems, tablets, smart phones or personal digital assistants, and so on. A particular implementation may include other functionality not described herein, e.g., wired and/or wireless network interfaces, media playing and/or recording capability, etc. In some embodiments, one or more cameras may be built into the computer rather than being supplied as separate components. Further, an image analyzer can be implemented using only a subset of computer system components (e.g., as a processor executing program code, an ASIC, or a fixed-function digital signal processor, with suitable I/O interfaces to receive image data and output analysis results).

While computer system 200 is described herein with reference to particular blocks, it is to be understood that the blocks are defined for convenience of description and are not intended to imply a particular physical arrangement of component parts. Further, the blocks need not correspond to physically distinct components. To the extent that physically distinct components are used, connections between components (e.g., for data communication) can be wired and/or wireless as desired.

Figure 3A:
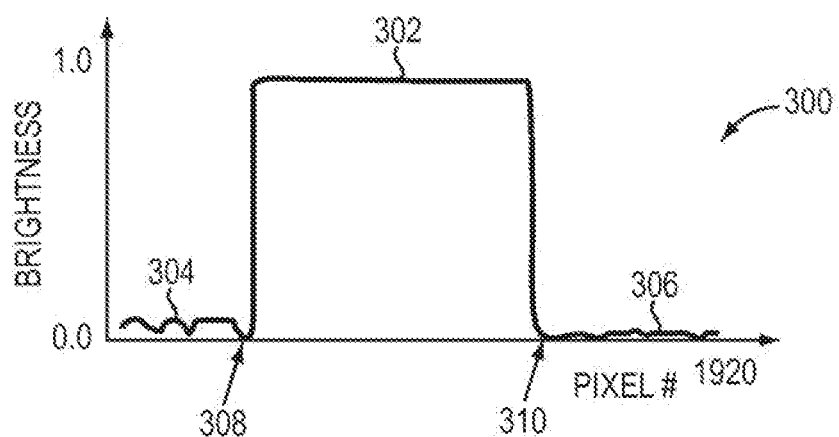
FIGS. 3A, 3B and 3C are graphs of brightness data for rows of pixels that may be obtained according to an embodiment of the present invention.
Figure 3B:
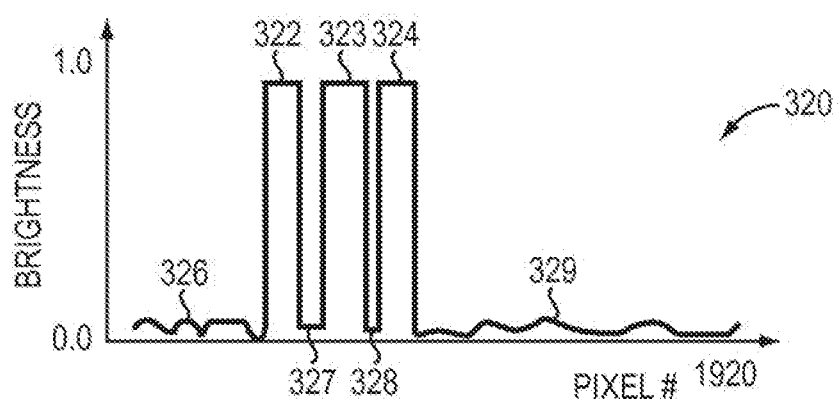
Figure 3C:
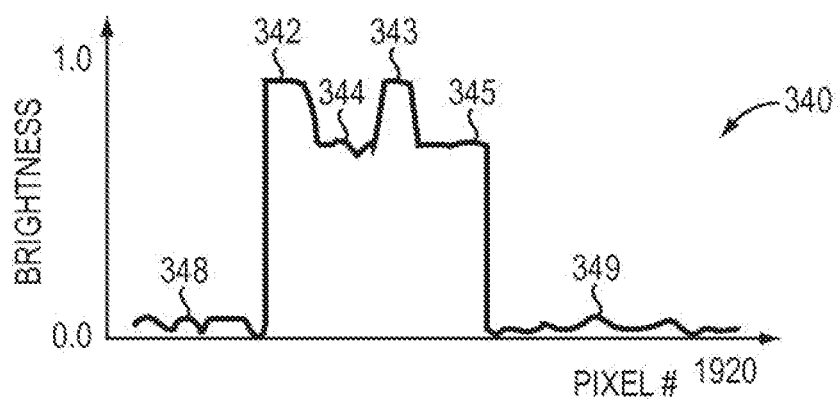

Execution of object detection module 222 by processor 202 can cause processor 202 to operate camera interface 206 to capture images of an object and to distinguish object pixels from background pixels by analyzing the image data. FIGS. 3A-3C are three different graphs of brightness data for rows of pixels that may be obtained according to various embodiments of the present invention. While each graph illustrates one pixel row, it is to be understood that an image typically contains many rows of pixels, and a row can contain any number of pixels; for instance, an HD video image can include 1080 rows having 1920 pixels each.

FIG. 3A illustrates brightness data 300 for a row of pixels in which the object has a single cross-section, such as a cross-section through a palm of a hand. Pixels in region 302, corresponding to the object, have high brightness while pixels in regions 304 and 306, corresponding to background, have considerably lower brightness. As can be seen, the object's location is readily apparent, and the locations of the edges of the object (at 308 at 310) are easily identified. For example, any pixel with brightness above 0.5 can be assumed to be an object pixel, while any pixel with brightness below 0.5 can be assumed to be a background pixel.

FIG. 3B illustrates brightness data 320 for a row of pixels in which the object has multiple distinct cross-sections, such as a cross-section through fingers of an open hand. Regions 322, 323, and 324, corresponding to the object, have high brightness while pixels in regions 326-329, corresponding to background, have low brightness. Again, a simple threshold cutoff on brightness (e.g., at 0.5) suffices to distinguish object pixels from background pixels, and the edges of the object can be readily ascertained.

FIG. 3C illustrates brightness data 340 for a row of pixels in which the distance to the object varies across the row, such as a cross-section of a hand with two fingers extending toward the camera. Regions 342 and 343 correspond to the extended fingers and have highest brightness; regions 344 and 345 correspond to other portions of the hand and are slightly less bright; this can be due in part to being farther away in part to shadows cast by the extended fingers.

Regions 348 and 349 are background regions and are considerably darker than hand-containing regions 342-345. A threshold cutoff on brightness (e.g., at 0.5) again suffices to distinguish object pixels from background pixels. Further analysis of the object pixels can also be performed to detect the edges of regions 342 and 343, providing additional information about the object's shape.

It will be appreciated that the data shown in FIGS. 3A-3C is illustrative. In some embodiments, it may be desirable to adjust the intensity of light sources 108, 110 such that an object at an expected distance (e.g., $r_O$ in FIG. 1) will be overexposed—that is, many if not all of the object pixels will be fully saturated to a brightness level of 1.0. (The actual brightness of the object may in fact be higher.) While this may also make the background pixels somewhat brighter, the $1/r^2$ falloff of light intensity with distance still leads to a ready distinction between object and background pixels as long as the intensity is not set so high that background pixels also approach the saturation level. As FIGS. 3A-3C illustrate, use of lighting directed at the object to create strong contrast between object and background allows the use of simple and fast algorithms to distinguish between background pixels and object pixels, which can be particularly useful in real-time motion-capture systems. Simplifying the task of distinguishing background and object pixels can also free up computing resources for other motion-capture tasks (e.g., reconstructing the object's position, shape, and/or motion).

Figure 4:
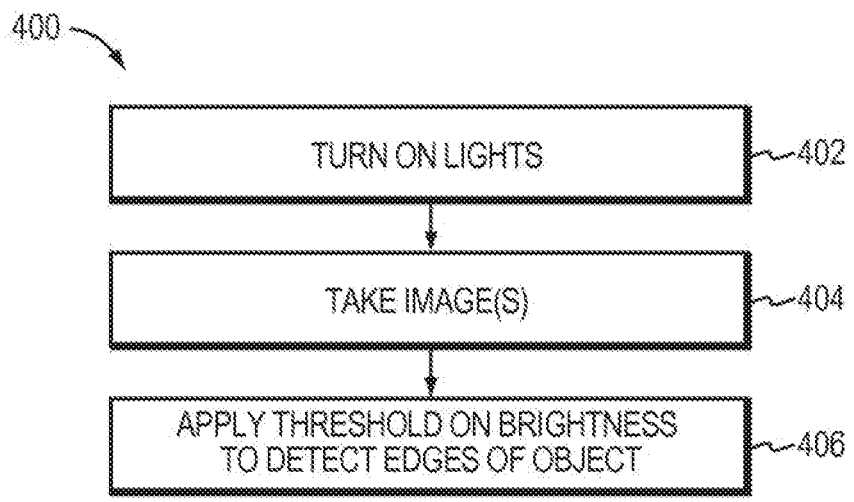
FIG. 4 is a flow diagram of a process for identifying the location of an object in an image according to an embodiment of the present invention.

Refer now to FIG. 4, which illustrates a process 400 for identifying the location of an object in an image according to an embodiment of the present invention. Process 400 can be implemented, e.g., in system 100 of FIG. 1. At block 402, light sources 108, 110 are turned on. At block 404, one or more images are captured using cameras 102, 104. In some embodiments, one image from each camera is captured. In other embodiments, a sequence of images is captured from each camera. The images from the two cameras can be closely correlated in time (e.g., simultaneous to within a few milliseconds) so that correlated images from the two cameras can be used to determine the 3D location of the object.

At block 406, a threshold pixel brightness is applied to distinguish object pixels from background pixels. Block 406 can also include identifying locations of edges of the object based on transition points between background and object pixels. In some embodiments, each pixel is first classified as either object or background based on whether it exceeds the threshold brightness cutoff. For example, as shown in FIGS. 3A-3C, a cutoff at a saturation level of 0.5 can be used. Once the pixels are classified, edges can be detected by finding locations where background pixels are adjacent to object pixels. In some embodiments, to avoid noise artifacts, the regions of background and object pixels on either side of the edge may be required to have a certain minimum size (e.g., 2, 4 or 8 pixels).

In other embodiments, edges can be detected without first classifying pixels as object or background. For example, $\Delta\beta$ can be defined as the difference in brightness between adjacent pixels, and $|\Delta\beta|$ above a threshold (e.g., 0.3 or 0.5 in terms of the saturation scale) can indicate a transition from background to object or from object to background between adjacent pixels. (The sign of $\Delta\beta$ can indicate the direction of the transition.) In some instances where the object's edge is actually in the middle of a pixel, there may be a pixel with an intermediate value at the boundary. This can be detected, e.g., by computing two brightness values for a pixel i: $\beta L=(\beta i+\beta i-1)/2$ and $\beta R=(\beta i+\beta i+1)/2$, where pixel (i−1) is to the left of pixel i and pixel (i+1) is to the right of pixel i. If pixel i is not near an edge, $|\beta L-\beta R|$ will generally be close to zero; if pixel is near an edge, then $|\beta L-\beta R|$ will be closer to 1, and a threshold on $|\beta L-\beta R|$ can be used to detect edges.

In some instances, one part of an object may partially occlude another in an image; for example, in the case of a hand, a finger may partly occlude the palm or another finger. Occlusion edges that occur where one part of the object partially occludes another can also be detected based on smaller but distinct changes in brightness once background pixels have been eliminated. FIG. 3C illustrates an example of such partial occlusion, and the locations of occlusion edges are apparent.

Detected edges can be used for numerous purposes. For example, as previously noted, the edges of the object as viewed by the two cameras can be used to determine an approximate location of the object in 3D space. The position of the object in a 2D plane transverse to the optical axis of the camera can be determined from a single image, and the offset (parallax) between the position of the object in time-correlated images from two different cameras can be used to determine the distance to the object if the spacing between the cameras is known.

Further, the position and shape of the object can be determined based on the locations of its edges in time-correlated images from two different cameras, and motion (including articulation) of the object can be determined from analysis of successive pairs of images. Examples of techniques that can be used to determine an object's position, shape and motion based on locations of edges of the object are described in co-pending U.S. Ser. No. 13/414,485, filed Mar. 7, 2012, the entire disclosure of which is incorporated herein by reference. Those skilled in the art with access to the present disclosure will recognize that other techniques for determining position, shape and motion of an object based on information about the location of edges of the object can also be used.

In accordance with the '485 application, an object's motion and/or position is reconstructed using small amounts of information. For example, an outline of an object's shape, or silhouette, as seen from a particular vantage point can be used to define tangent lines to the object from that vantage point in various planes, referred to herein as "slices." Using as few as two different vantage points, four (or more) tangent lines from the vantage points to the object can be obtained in a given slice. From these four (or more) tangent lines, it is possible to determine the position of the object in the slice and to approximate its cross-section in the slice, e.g., using one or more ellipses or other simple closed curves. As another example, locations of points on an object's surface in a particular slice can be determined directly (e.g., using a time-of-flight camera), and the position and shape of a cross-section of the object in the slice can be approximated by fitting an ellipse or other simple closed curve to the points. Positions and cross-sections determined for different slices can be correlated to construct a 3D model of the object, including its position and shape. A succession of images can be analyzed using the same technique to model motion of the object. Motion of a complex object that has multiple separately articulating members (e.g., a human hand) can be modeled using these techniques.

More particularly, an ellipse in the xy plane can be characterized by five parameters: the x and y coordinates of the center $(x_C, y_C)$, the semimajor axis, the semiminor axis, and a rotation angle (e.g., angle of the semimajor axis relative to the x axis). With only four tangents, the ellipse is underdetermined. However, an efficient process for estimating the ellipse in spite of this fact involves making an initial working assumption (or "guess") as to one of the parameters and revisiting the assumption as additional information is gathered during the analysis. This additional information can include, for example, physical constraints based on properties of the cameras and/or the object. In some circumstances, more than four tangents to an object may be available for some or all of the slices, e.g., because more than two vantage points are available. An elliptical cross-section can still be determined, and the process in some instances is somewhat simplified as there is no need to assume a parameter value. In some instances, the additional tangents may create additional complexity. In some circumstances, fewer than four tangents to an object may be available for some or all of the slices, e.g., because an edge of the object is out of range of the field of view of one camera or because an edge was not detected. A slice with three tangents can be analyzed. For example, using two parameters from an ellipse fit to an adjacent slice (e.g., a slice that had at least four tangents), the system of equations for the ellipse and three tangents is sufficiently determined that it can be solved. As another option, a circle can be fit to the three tangents; defining a circle in a plane requires only three parameters (the center coordinates and the radius), so three tangents suffice to fit a circle. Slices with fewer than three tangents can be discarded or combined with adjacent slices.

To determine geometrically whether an object corresponds to an object of interest comprises, one approach is to look for continuous volumes of ellipses that define an object and discard object segments geometrically inconsistent with the ellipse-based definition of the object—e.g., segments that are too cylindrical or too straight or too thin or too small or too far away—and discarding these. If a sufficient number of ellipses remain to characterize the object and it conforms to the object of interest, it is so identified, and may be tracked from frame to frame.

Figure 5:
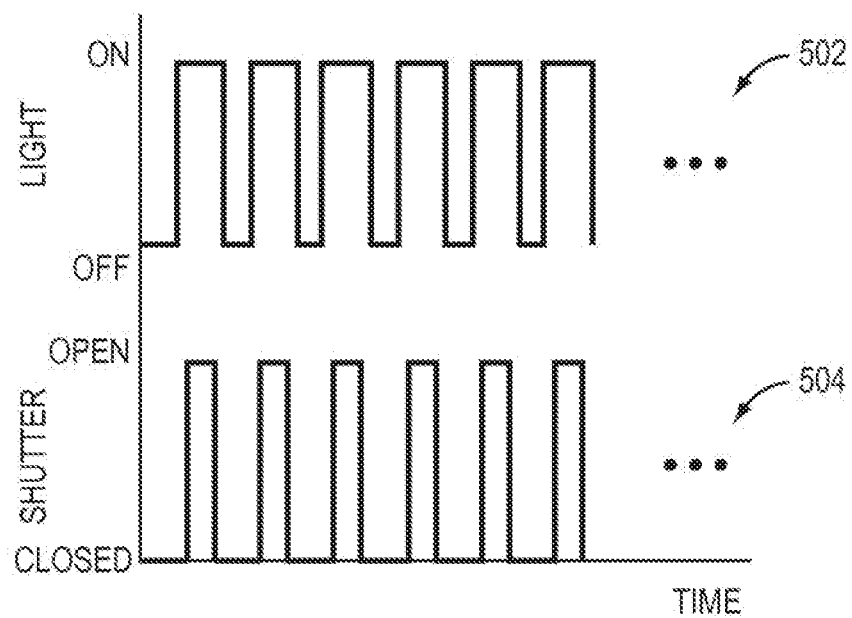
FIG. 5 illustrates a timeline in which light sources pulsed on at regular intervals according to an embodiment of the present invention.

In some embodiments, each of a number of slices is analyzed separately to determine the size and location of an elliptical cross-section of the object in that slice. This provides an initial 3D model (specifically, a stack of elliptical cross-sections), which can be refined by correlating the cross-sections across different slices. For example, it is expected that an object's surface will have continuity, and discontinuous ellipses can accordingly be discounted. Further refinement can be obtained by correlating the 3D model with itself across time, e.g., based on expectations related to continuity in motion and deformation. With renewed reference to FIGS. 1 and 2, in some embodiments, light sources 108, 110 can be operated in a pulsed mode rather than being continually on. This can be useful, e.g., if light sources 108, 110 have the ability to produce brighter light in a pulse than in a steady-state operation. FIG. 5 illustrates a timeline in which light sources 108, 110 are pulsed on at regular intervals as shown at 502. The shutters of cameras 102, 104 can be opened to capture images at times coincident with the light pulses as shown at 504. Thus, an object of interest can be brightly illuminated during the times when images are being captured. In some embodiments, the silhouettes of an object are extracted from one or more images of the object that reveal information about the object as seen from different vantage points. While silhouettes can be obtained using a number of different techniques, in some embodiments, the silhouettes are obtained by using cameras to capture images of the object and analyzing the images to detect object edges.

In some embodiments, the pulsing of light sources 108, 110 can be used to further enhance contrast between an object of interest and background. In particular, the ability to discriminate between relevant and irrelevant (e.g., background) objects in a scene can be compromised if the scene contains object that themselves emit light or are highly reflective. This problem can be addressed by setting the camera exposure time to extraordinarily short periods (e.g., 100 microseconds or less) and pulsing the illumination at very high powers (i.e., 5 to 20 watts or, in some cases, to higher levels, e.g., 40 watts). In this period of time, most common sources of ambient illumination (e.g., fluorescent lights) are very dark by comparison to such bright, short-period illumination; that is, in microseconds, non-pulsed light sources are dimmer than they would appear at an exposure time of milliseconds or more. In effect, this approach increases the contrast of an object of interest with respect to other objects, even those emitting in the same general band. Accordingly, discriminating by brightness under such conditions allows irrelevant objects to be ignored for purposes of image reconstruction and processing. Average power consumption is also reduced; in the case of 20 watts for 100 microseconds, the average power consumption is under 10 milliwatts. In general, the light sources 108, 110 are operated so as to be on during the entire camera exposure period, i.e., the pulse width is equal to the exposure time and is coordinated therewith.

Figure 6:
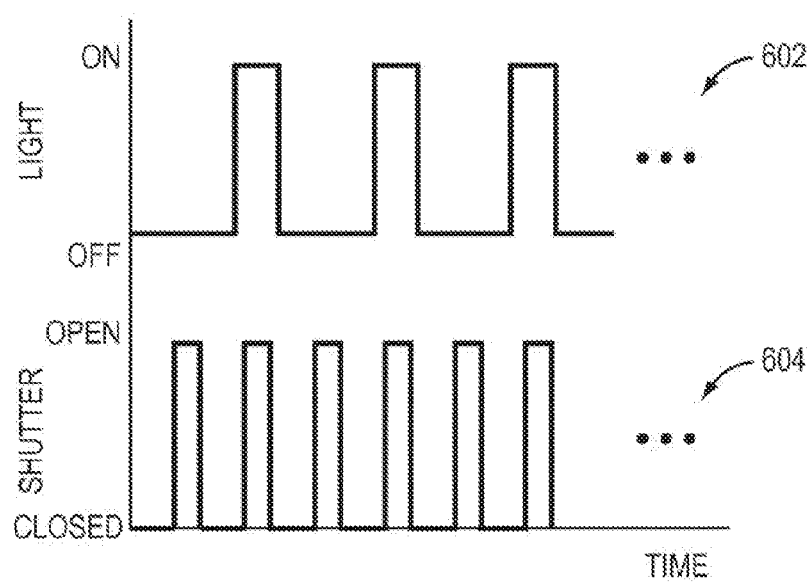
FIG. 6 illustrates a timeline for pulsing light sources and capturing images according to an embodiment of the present invention.

It is also possible to coordinate pulsing of lights 108, 110 for purposes of by comparing images taken with lights 108, 110 on and images taken with lights 108, 110 off. FIG. 6 illustrates a timeline in which light sources 108, 110 are pulsed on at regular intervals as shown at 602, while shutters of cameras 102, 104 are opened to capture images at times shown at 604. In this case, light sources 108, 110 are "on" for every other image. If the object of interest is significantly closer than background regions to light sources 108, 110, the difference in light intensity will be stronger for object pixels than for background pixels. Accordingly, comparing pixels in successive images can help distinguish object and background pixels.

Figure 7:
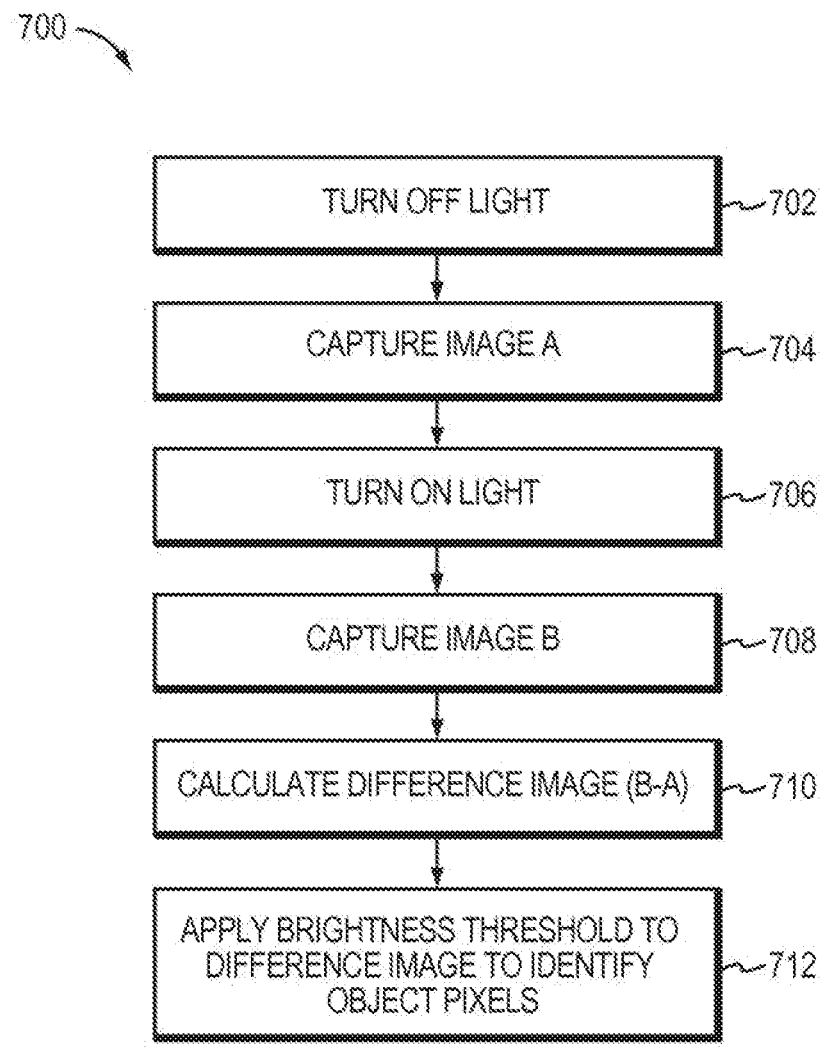
FIG. 7 is a flow diagram of a process for identifying object edges using successive images according to an embodiment of the present invention.

FIG. 7 is a flow diagram of a process 700 for identifying object edges using successive images according to an embodiment of the present invention. At block 702, the light sources are turned off, and at block 704 a first image (A) is captured. Then, at block 706, the light sources are turned on, and at block 708 a second image (B) is captured. At block 710, a "difference" image B—A is calculated, e.g., by subtracting the brightness value of each pixel in image A from the brightness value of the corresponding pixel in image B. Since image B was captured with lights on, it is expected that B—A will be positive for most pixels.

The difference image is used to discriminate between background and foreground by applying a threshold or other metric on a pixel-by-pixel basis. At block 712, a threshold is applied to the difference image (B-A) to identify object pixels, with (B-A) above a threshold being associated with object pixels and (B-A) below the threshold being associated with background pixels. Object edges can then be defined by identifying where object pixels are adjacent to background pixels, as described above. Object edges can be used for purposes such as position and/or motion detection, as described above.

In an alternative embodiment, object edges are identified using a triplet of image frames rather than a pair. For example, in one implementation, a first image (Image1) is obtained with the light sources turned off; a second image (Image2) is obtained with the light sources turned on; and a third image (Image3) is taken with the light sources again turned off. Two difference images, Image4=abs(Image2−Image1) and Image5=abs(Image2−Image3)

are then defined by subtracting pixel brightness values. A final image, Image6, is defined based on the two images Image4 and Image5. In particular, the value of each pixel in Image6 is the smaller of the two corresponding pixel values in Image4 and Image5. In other words, Image6=min(Image4, Image5) on a pixel-by-pixel basis. Image6 represents an enhanced-accuracy difference image and most of its pixels will be positive. Once again, a threshold or other metric can be used on a pixel-by-pixel basis to distinguish foreground and background pixels.

Contrast-based object detection as described herein can be applied in any situation where objects of interest are expected to be significantly closer (e.g., half the distance) to the light source(s) than background objects. One such application relates to the use of motion-detection as user input to interact with a computer system. For example, the user may point to the screen or make other hand gestures, which can be interpreted by the computer system as input.

A computer system 800 incorporating a motion detector as a user input device according to an embodiment of the present invention is illustrated in FIG. 8. Computer system 800 includes a desktop box 802 that can house various components of a computer system such as processors, memory, fixed or removable disk drives, video drivers, audio drivers, network interface components, and so on. A display 804 is connected to desktop box 802 and positioned to be viewable by a user. A keyboard 806 is positioned within easy reach of the user's hands. A motion-detector unit 808 is placed near keyboard 806 (e.g., behind, as shown or to one side), oriented toward a region in which it would be natural for the user to make gestures directed at display 804 (e.g., a region in the air above the keyboard and in front of the monitor). Cameras 810, 812 (which can be similar or identical to cameras 102, 104 described above) are arranged to point generally upward, and light sources 814, 816 (which can be similar or identical to light sources 108, 110 described above) are arranged to either side of cameras 810, 812 to illuminate an area above motion-detector unit 808. In typical implementations, the cameras 810, 812 and the light sources 814, 816 are substantially coplanar. This configuration prevents the appearance of shadows that can, for example, interfere with edge detection (as can be the case were the light sources located between, rather than flanking, the cameras). A filter, not shown, can be placed over the top of motion-detector unit 808 (or just over the apertures of cameras 810, 812) to filter out all light outside a band around the peak frequencies of light sources 814, 816.

In the illustrated configuration, when the user moves a hand or other object (e.g., a pencil) in the field of view of cameras 810, 812, the background will likely consist of a ceiling and/or various ceiling-mounted fixtures. The user's hand can be 10-20 cm above motion detector 808, while the ceiling may be five to ten times that distance (or more). Illumination from light sources 814, 816 will therefore be much more intense on the user's hand than on the ceiling, and the techniques described herein can be used to reliably distinguish object pixels from background pixels in images captured by cameras 810, 812. If infrared light is used, the user will not be distracted or disturbed by the light.

Computer system 800 can utilize the architecture shown in FIG. 1. For example, cameras 810, 812 of motion-detector unit 808 can provide image data to desktop box 802, and image analysis and subsequent interpretation can be performed using the processors and other components housed within desktop box 802. Alternatively, motion-detector unit 808 can incorporate processors or other components to perform some or all stages of image analysis and interpretation. For example, motion-detector unit 808 can include a processor (programmable or fixed-function) that implements one or more of the processes described above to distinguish between object pixels and background pixels. In this case, motion-detector unit 808 can send a reduced representation of the captured images (e.g., a representation with all background pixels zeroed out) to desktop box 802 for further analysis and interpretation. A particular division of computational tasks between a processor inside motion-detector unit 808 and a processor inside desktop box 802 is not required.

It is not always necessary to discriminate between object pixels and background pixels by absolute brightness levels; for example, where knowledge of object shape exists, the pattern of brightness falloff can be utilized to detect the object in an image even without explicit detection of object edges. On rounded objects (such as hands and fingers), for example, the $1/r^2$ relationship produces Gaussian or near-Gaussian brightness distributions near the centers of the objects; imaging a cylinder illuminated by an LED and disposed perpendicularly with respect to a camera results in an image having a bright center line corresponding to the cylinder axis, with brightness falling off to each side (around the cylinder circumference). Fingers are approximately cylindrical, and by identifying these Gaussian peaks, it is possible to locate fingers even in situations where the background is close and the edges are not visible due to the relative brightness of the background (either due to proximity or the fact that it may be actively emitting infrared light). The term "Gaussian" is used broadly herein to connote a curve with a negative second derivative. Often such curves will be bell-shaped and symmetric, but this is not necessarily the case; for example, in situations with higher object secularity or if the object is at an extreme angle, the curve may be skewed in a particular direction. Accordingly, as used herein, the term "Gaussian" is not limited to curves explicitly conforming to a Gaussian function.

FIG. 9 illustrates a tablet computer 900 incorporating a motion detector according to an embodiment of the present invention. Tablet computer 900 has a housing, the front surface of which incorporates a display screen 902 surrounded by a bezel 904. One or more control buttons 906 can be incorporated into bezel 904. Within the housing, e.g., behind display screen 902, tablet computer 900 can have various conventional computer components (processors, memory, network interfaces, etc.). A motion detector 910 can be implemented using cameras 912, 914 (e.g., similar or identical to cameras 102, 104 of FIG. 1) and light sources 916, 918 (e.g., similar or identical to light sources 108, 110 of FIG. 1) mounted into bezel 904 and oriented toward the front surface so as to capture motion of a user positioned in front of tablet computer 900.

When the user moves a hand or other object in the field of view of cameras 912, 914, the motion is detected as described above. In this case, the background is likely to be the user's own body, at a distance of roughly 25-30 cm from tablet computer 900. The user may hold a hand or other object at a short distance from display 902, e.g., 5-10 cm. As long as the user's hand is significantly closer than the user's body (e.g., half the distance) to light sources 916, 918, the illumination-based contrast enhancement techniques described herein can be used to distinguish object pixels from background pixels. The image analysis and subsequent interpretation as input gestures can be done within tablet computer 900 (e.g., leveraging the main processor to execute operating-system or other software to analyze data obtained from cameras 912, 914). The user can thus interact with tablet 900 using gestures in 3D space.

A goggle system 1000, as shown in FIG. 10, may also incorporate a motion detector according to an embodiment of the present invention. Goggle system 1000 can be used, e.g., in connection with virtual-reality and/or augmented-reality environments. Goggle system 1000 includes goggles 1002 that are wearable by a user, similar to conventional eyeglasses. Goggles 1002 include eyepieces 1004, 1006 that can incorporate small display screens to provide images to the user's left and right eyes, e.g., images of a virtual reality environment. These images can be provided by a base unit 1008 (e.g., a computer system) that is in communication with goggles 1002, either via a wired or wireless channel. Cameras 1010, 1012 (e.g., similar or identical to cameras 102, 104 of FIG. 1) can be mounted in a frame section of goggles 1002 such that they do not obscure the user's vision. Light sources 1014, 1016 can be mounted in the frame section of goggles 1002 to either side of cameras 1010, 1012. Images collected by cameras 1010, 1012 can be transmitted to base unit 1008 for analysis and interpretation as gestures indicating user interaction with the virtual or augmented environment. (In some embodiments, the virtual or augmented environment presented through eyepieces 1004, 1006 can include a representation of the user's hand, and that representation can be based on the images collected by cameras 1010, 1012.)

When the user gestures using a hand or other object in the field of view of cameras 1008, 1010, the motion is detected as described above. In this case, the background is likely to be a wall of a room the user is in, and the user will most likely be sitting or standing at some distance from the wall. As long as the user's hand is significantly closer than the user's body (e.g., half the distance) to light sources 1012, 1014, the illumination-based contrast enhancement techniques described herein facilitate distinguishing object pixels from background pixels. The image analysis and subsequent interpretation as input gestures can be done within base unit 1008.

It will be appreciated that the motion-detector implementations shown in FIGS. 8-10 are illustrative and that variations and modifications are possible. For example, a motion detector or components thereof can be combined in a single housing with other user input devices, such as a keyboard or trackpad. As another example, a motion detector can be incorporated into a laptop computer, e.g., with upward-oriented cameras and light sources built into the same surface as the laptop keyboard (e.g., to one side of the keyboard or in front of or behind it) or with front-oriented cameras and light sources built into a bezel surrounding the laptop's display screen. As still another example, a wearable motion detector can be implemented, e.g., as a headband or headset that does not include active displays or optical components.

Figure 11:
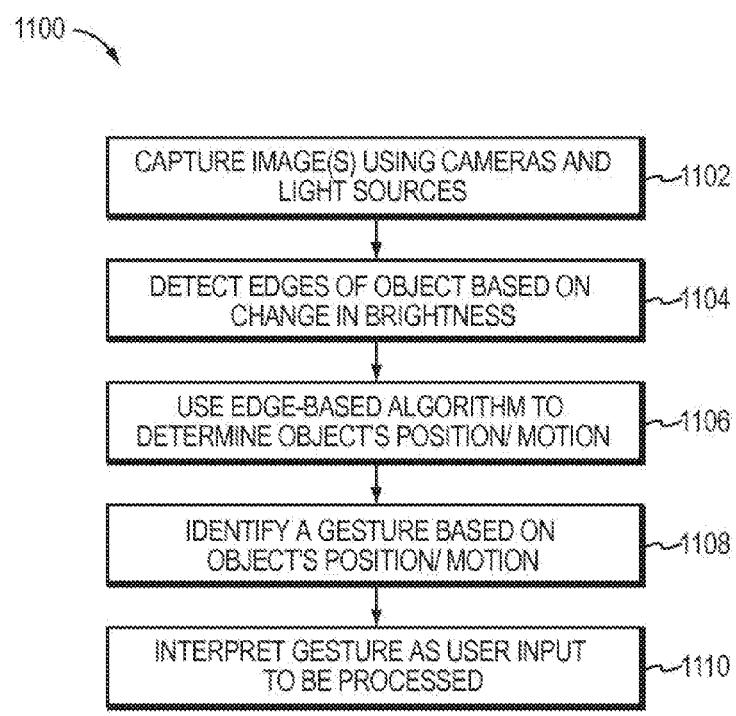
FIG. 11 is a flow diagram of a process for using motion information as user input to control a computer system or other system according to an embodiment of the present invention.

As illustrated in FIG. 11, motion information can be used as user input to control a computer system or other system according to an embodiment of the present invention. Process 1100 can be implemented, e.g., in computer systems such as those shown in FIGS. 8-10. At block 1102, images are captured using the light sources and cameras of the motion detector. As described above, capturing the images can include using the light sources to illuminate the field of view of the cameras such that objects closer to the light sources (and the cameras) are more brightly illuminated than objects farther away.

At block 1104, the captured images are analyzed to detect edges of the object based on changes in brightness. For example, as described above, this analysis can include comparing the brightness of each pixel to a threshold, detecting transitions in brightness from a low level to a high level across adjacent pixels, and/or comparing successive images captured with and without illumination by the light sources. At block 1106, an edge-based algorithm is used to determine the object's position and/or motion. This algorithm can be, for example, any of the tangent-based algorithms described in the above-referenced '485 application; other algorithms can also be used.

At block 1108, a gesture is identified based on the object's position and/or motion. For example, a library of gestures can be defined based on the position and/or motion of a user's fingers. A "tap" can be defined based on a fast motion of an extended finger toward a display screen. A "trace" can be defined as motion of an extended finger in a plane roughly parallel to the display screen. An inward pinch can be defined as two extended fingers moving closer together and an outward pinch can be defined as two extended fingers moving farther apart. Swipe gestures can be defined based on movement of the entire hand in a particular direction (e.g., up, down, left, right) and different swipe gestures can be further defined based on the number of extended fingers (e.g., one, two, all). Other gestures can also be defined. By comparing a detected motion to the library, a particular gesture associated with detected position and/or motion can be determined.

At block 1110, the gesture is interpreted as user input, which the computer system can process. The particular processing generally depends on application programs currently executing on the computer system and how those programs are configured to respond to particular inputs. For example, a tap in a browser program can be interpreted as selecting a link toward which the finger is pointing. A tap in a word-processing program can be interpreted as placing the cursor at a position where the finger is pointing or as selecting a menu item or other graphical control element that may be visible on the screen. The particular gestures and interpretations can be determined at the level of operating systems and/or applications as desired, and no particular interpretation of any gesture is required.

Full-body motion can be captured and used for similar purposes. In such embodiments, the analysis and reconstruction advantageously occurs in approximately real-time (e.g., times comparable to human reaction times), so that the user experiences a natural interaction with the equipment. In other applications, motion capture can be used for digital rendering that is not done in real time, e.g., for computer-animated movies or the like; in such cases, the analysis can take as long as desired.

Embodiments described herein provide efficient discrimination between object and background in captured images by exploiting the decrease of light intensity with distance. By brightly illuminating the object using one or more light sources that are significantly closer to the object than to the background (e.g., by a factor of two or more), the contrast between object and background can be increased. In some instances, filters can be used to remove light from sources other than the intended sources. Using infrared light can reduce unwanted "noise" or bright spots from visible light sources likely to be present in the environment where images are being captured and can also reduce distraction to users (who presumably cannot see infrared).

Figure 12:
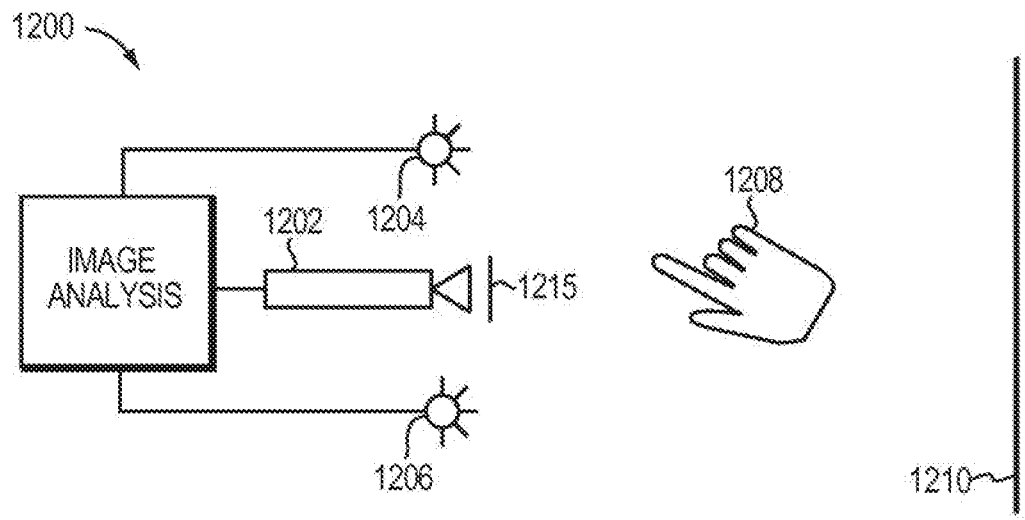
FIG. 12 illustrates a system for capturing image data according to another embodiment of the present invention.

The embodiments described above provide two light sources, one disposed to either side of the cameras used to capture images of the object of interest. This arrangement can be particularly useful where the position and motion analysis relies on knowledge of the object's edges as seen from each camera, as the light sources will illuminate those edges. However, other arrangements can also be used. For example, FIG. 12 illustrates a system 1200 with a single camera 1202 and two light sources 1204, 1206 disposed to either side of camera 1202. This arrangement can be used to capture images of object 1208 and shadows cast by object 1208 against a flat background region 1210. In this embodiment, object pixels and background pixels can be readily distinguished. In addition, provided that background 1210 is not too far from object 1208, there will still be enough contrast between pixels in the shadowed background region and pixels in the unshadowed background region to allow discrimination between the two. Position and motion detection algorithms using images of an object and its shadows are described in the above-referenced '485 application and system 1200 can provide input information to such algorithms, including the location of edges of the object and its shadows.

The single-camera implementation 1200 may benefit from inclusion of a holographic diffraction grating 1215 placed in front of the lens of the camera 1202. The grating 1215 creates fringe patterns that appear as ghost silhouettes and/or tangents of the object 1208. Particularly when separable (i.e., when overlap is not excessive), these patterns provide high contrast facilitating discrimination of object from background. See, e.g., DIFFRACTION GRATING HANDBOOK (Newport Corporation, January 2005; available at http://gratings.newport.com/library/handbook/handbook.asp), the entire disclosure of which is hereby incorporated by reference.

Figure 13:
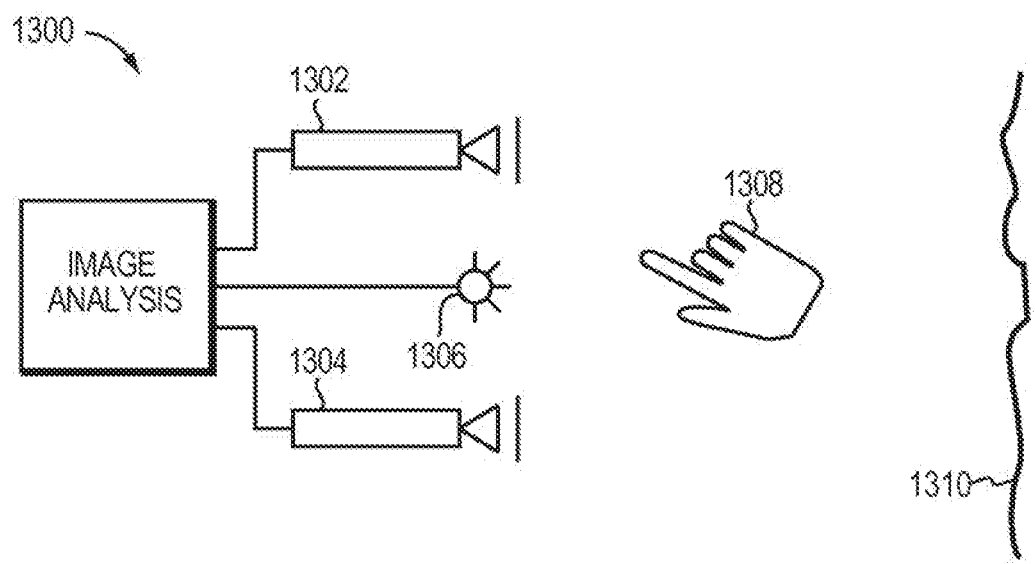
FIG. 13 illustrates a system for capturing image data according to still another embodiment of the present invention.

FIG. 13 illustrates another system 1300 with two cameras 1302, 1304 and one light source 1306 disposed between the cameras. System 1300 can capture images of an object 1308 against a background 1310. System 1300 is generally less reliable for edge illumination than system 100 of FIG. 1; however, not all algorithms for determining position and motion rely on precise knowledge of the edges of an object. Accordingly, system 1300 can be used, e.g., with edge-based algorithms in situations where less accuracy is required. System 1300 can also be used with non-edge-based algorithms.

While the invention has been described with respect to specific embodiments, one skilled in the art will recognize that numerous modifications are possible. The number and arrangement of cameras and light sources can be varied. The cameras' capabilities, including frame rate, spatial resolution, and intensity resolution, can also be varied as desired. The light sources can be operated in continuous or pulsed mode. The systems described herein provide images with enhanced contrast between object and background to facilitate distinguishing between the two, and this information can be used for numerous purposes, of which position and/or motion detection is just one among many possibilities.

Threshold cutoffs and other specific criteria for distinguishing object from background can be adapted for particular cameras and particular environments. As noted above, contrast is expected to increase as the ratio $r_B/r_O$ increases. In some embodiments, the system can be calibrated in a particular environment, e.g., by adjusting light-source brightness, threshold criteria, and so on. The use of simple criteria that can be implemented in fast algorithms can free up processing power in a given system for other uses.

Any type of object can be the subject of motion capture using these techniques, and various aspects of the implementation can be optimized for a particular object. For example, the type and positions of cameras and/or light sources can be optimized based on the size of the object whose motion is to be captured and/or the space in which motion is to be captured. Analysis techniques in accordance with embodiments of the present invention can be implemented as algorithms in any suitable computer language and executed on programmable processors. Alternatively, some or all of the algorithms can be implemented in fixed-function logic circuits, and such circuits can be designed and fabricated using conventional or other tools.

Computer programs incorporating various features of the present invention may be encoded on various computer readable storage media; suitable media include magnetic disk or tape, optical storage media such as compact disk (CD) or DVD (digital versatile disk), flash memory, and any other non-transitory medium capable of holding data in a computer-readable form. Computer-readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download.

Thus, although the invention has been described with respect to specific embodiments, it will be appreciated that the invention is intended to cover all modifications and equivalents within the scope of the following claims.

The invention claimed is:

1. A method identifying a hand by analyzing captured images, the method comprising:
    activating at least one light source to illuminate a field of view containing a background and the hand including fingers;
    operating a camera to capture a plurality of digital images including a first digital image captured at a time when the at least one light source is illuminating the field of view;
    identifying pixels of the plurality of digital images that correspond to fingers of the hand that are visible in the plurality of digital images rather than to the background, the identifying including:
        detecting, from the plurality of digital images, Gaussian brightness falloff patterns indicative of the fingers of the hand that are visible;
        identifying a centerline axis of the visible fingers of the hand based on the detected Gaussian brightness falloff patterns indicative of the fingers without identifying edges of the visible fingers; and
        identifying the pixels that correspond to the visible fingers based on the identified centerline axis of the visible fingers;
    tracking motion of the identified pixels that correspond to the visible fingers through the plurality of digital images; and
    constructing a model of the visible fingers based on the identified pixels that correspond to the visible fingers and the tracked motion of the identified pixels that correspond to the visible fingers.

2. The method of claim 1, further comprising:
    comparing the tracked motion to a library of gestures;

identifying a particular gesture from the library of gestures that corresponds to the tracked motion; and
enabling the particular gesture that corresponds to the tracked motion.

3. The method of claim 1, wherein:
the constructing of the model includes constructing a 3D model of the visible fingers, including a position and a shape of the visible fingers, to geometrically determine whether the visible fingers correspond to an object of interest; and
the at least one light source is positioned such that objects of interest are located within a proximal zone of the field of view, the proximal zone extending from the camera to a distance less than twice an expected maximum distance between the objects of interest and the camera.

4. The method of claim 1, wherein:
the constructing of the model includes constructing a 3D model of the visible fingers, including a position and a shape of the visible fingers, to geometrically determine whether the visible fingers correspond to an object of interest; and
the at least one light source is positioned such that objects of interest are located within a proximal zone of the field of view, the proximal zone extending from the camera to a distance that is half or less than a distance to the background.

5. The method of claim 1, wherein edges of at least one of the visible fingers is not visible in at least one digital image of the plurality of digital images.

6. The method of claim 1, wherein the Gaussian brightness falloff patterns are characterized by a negative second derivative.

7. The method of claim 1, wherein the Gaussian brightness falloff patterns include an asymmetric curve.

8. The method of claim 1, wherein the identifying of the pixels that correspond to the visible fingers includes:
comparing pixels in successive digital images of the plurality of digital images to distinguish pixels corresponding to the visible fingers from pixels corresponding to the background.

9. The method of claim 1, wherein the identifying of the pixels that correspond to the visible fingers includes:
generating a reduced representation of each digital image of the plurality of digital images in which identified pixels corresponding to the background are zeroed out.

10. An image capture and analysis system for identifying a hand by analyzing captured images, the image capture and analysis system comprising:
at least one camera oriented toward a field of view containing a background and the hand including fingers;
at least one light source disposed on a same side of the field of view as the camera and oriented to illuminate the field of view; and
an image analyzer coupled to the at least one camera and the light source and configured to:
activate the at least one light source to illuminate the field of view;
operate the at least one camera to capture a plurality of digital images including a first digital image captured at a time when the at least one light source is illuminating the field of view;
identify pixels of the plurality of digital images that correspond to fingers of the hand that are visible in the plurality of digital images rather than to the background, the image analyzer identifying the pixels by:
detecting, from the plurality of digital images, Gaussian brightness falloff patterns indicative of the fingers of the hand that are visible;
identifying a centerline axis of the visible fingers of the hand based on the detected Gaussian brightness falloff patterns indicative of the fingers without identifying edges of the visible fingers; and
identifying the pixels that correspond to the visible fingers based on the identified centerline axis of the visible fingers; and
track motion of the identified pixels that correspond to the visible fingers through the plurality of digital images; and
construct a model of the visible fingers based on the identified pixels that correspond to the visible fingers and the tracked motion of the identified pixels that correspond to the visible fingers.

11. The image capture and analysis system of claim 10, wherein image analyzer is further configured to:
compare the tracked motion to a library of gestures;
identify a particular gesture from the library of gestures that corresponds to the tracked motion; and
enable the particular gesture that corresponds to the tracked motion.

12. The image capture and analysis system of claim 10, wherein:
the image analyzer constructs the model by constructing a 3D model of the visible fingers, including a position and a shape of the visible fingers, to geometrically determine whether the visible fingers correspond to an object of interest; and
the at least one light source is positioned such that objects of interest are located within a proximal zone of the field of view, the proximal zone extending from the camera to a distance less than twice an expected maximum distance between the objects of interest and the camera.

13. The image capture and analysis system of claim 10, wherein:
the image analyzer constructs the model by constructing a 3D model of the visible fingers, including a position and a shape of the visible fingers, to geometrically determine whether the visible fingers correspond to an object of interest; and
the at least one light source is positioned such that objects of interest are located within a proximal zone of the field of view, the proximal zone extending from the camera to a distance that is half or less than a distance to the background.

14. The image capture and analysis system of claim 10, wherein edges of at least one of the visible fingers is not visible in at least one digital image of the plurality of digital images.

15. The image capture and analysis system of claim 10, wherein the Gaussian brightness falloff patterns are characterized by a negative second derivative.

16. The image capture and analysis system of claim 10, wherein the Gaussian brightness falloff patterns include an asymmetric curve.

17. The image capture and analysis system of claim 10, wherein the image analyzer identifies the pixels that correspond to the visible fingers by:

comparing pixels in successive digital images of the plurality of digital images to distinguish pixels corresponding to the visible fingers from pixels corresponding to the background.

18. The image capture and analysis system of claim 10, wherein the image analyzer identifies the pixels that correspond to the visible fingers by:
generating a reduced representation of each digital image of the plurality of digital images in which identified pixels corresponding to the background are zeroed out.

19. A wearable goggle, comprising:
at least one camera oriented toward a field of view containing a background and a hand including fingers;
at least one light source disposed on a same side of the field of view as the camera and oriented to illuminate the field of view; and
a processor coupled to the at least one camera and the light source and configured to:
  activate the at least one light source to illuminate the field of view;
  operate the at least one camera to capture a plurality of digital images including a first digital image captured at a time when the at least one light source is illuminating the field of view;
  identify pixels of the plurality of digital images that correspond to fingers of the hand that are visible in the plurality of digital images rather than to the background, the processor identifying the pixels by:
    detecting, from the plurality of digital images, Gaussian brightness falloff patterns indicative of the fingers of the hand that are visible;
    identifying a centerline axis of the visible fingers of the hand based on the detected Gaussian brightness falloff patterns indicative of the fingers without identifying edges of the visible fingers; and
    identifying the pixels that correspond to the visible fingers based on the identified centerline axis of the visible fingers; and
  track motion of the identified pixels that correspond to the visible fingers through the plurality of digital images; and
  construct a model of the visible fingers based on the identified pixels that correspond to the visible fingers and the tracked motion of the identified pixels that correspond to the visible fingers.

\* \* \* \* \*